United States Patent [19]

Kaniwa et al.

[11] Patent Number: 5,699,370

[45] Date of Patent: Dec. 16, 1997

[54] INFORMATION RECORDING AND REPRODUCTION APPARATUS TO BE CONTROLLED BY TEMPORAL INFORMATION

[75] Inventors: Kouji Kaniwa, Yokohama; Hideo Nishijima, Katsuta; Nobutaka Amada, Yokohama; Hiroo Okamoto, Yokohama; Takaharu Noguchi, Yokohama; Hiroaki Ono, Fujisawa; Hitoaki Owashi; Takao Arai, both of Yokohama; Hiroya Abe, Hiratsuka; Kouji Minabe, Katsuta, all of Japan

[73] Assignee: Hitachi, Ltd., Tokyo, Japan

[21] Appl. No.: 390,574

[22] Filed: Feb. 17, 1995

[30] Foreign Application Priority Data

Feb. 17, 1994 [JP] Japan .................... 6-020133
Mar. 4, 1994 [JP] Japan .................... 6-034401

[51] Int. Cl.⁶ .................................... G11B 15/087
[52] U.S. Cl. .................... 371/57.1; 348/10; 348/460; 386/46; 386/109
[58] Field of Search .................... 360/10.3; 348/460, 348/10; 358/320, 323, 337, 339; 321/37.9, 37.5, 40.1, 40.3; 371/57.1; 386/46, 83, 109

[56] References Cited

U.S. PATENT DOCUMENTS

| | | | |
|---|---|---|---|
| 4,758,902 | 7/1988 | Okamoto et al. | 360/18 |
| 4,882,732 | 11/1989 | Kaminaga | 371/2.2 |
| 4,943,964 | 7/1990 | Hatanaka et al. | 371/31 |
| 5,083,225 | 1/1992 | Morisaki et al. | 360/64 |
| 5,132,992 | 7/1992 | Yurt et al. | 375/240 |
| 5,172,380 | 12/1992 | Odaka | 371/37.4 |
| 5,181,107 | 1/1993 | Rhoades | 358/86 |
| 5,192,949 | 3/1993 | Suzuki et al. | 341/68 |
| 5,247,523 | 9/1993 | Arai et al. | 371/37.4 |
| 5,311,522 | 5/1994 | Murakami | 371/37.4 |
| 5,337,199 | 8/1994 | Arai et al. | 360/8 |
| 5,432,558 | 7/1995 | Kim | 348/460 |
| 5,432,769 | 7/1995 | Honjo | 369/60 |
| 5,438,423 | 8/1995 | Lynch et al. | 386/109 |
| 5,440,334 | 8/1995 | Walters et al. | 348/6 |
| 5,481,411 | 1/1996 | Nakatani | 358/311 |
| 5,500,741 | 3/1996 | Baik et al. | 358/335 |
| 5,502,573 | 3/1996 | Fujinami | 358/339 |
| 5,523,794 | 6/1996 | Mankovitz et al. | 348/460 |
| 5,559,999 | 9/1996 | Maturi et al. | 395/551 |

OTHER PUBLICATIONS

*Journal of the Institute of Television Engineers of Japan* entitled "Minor Feature: Technical Trend of Cable Television", vol. 47, No. 8, 1993, pp. 1069-1073 and 1082-1087.
*The Institute of Television Engineers of Japan* entitled "Minor Feature: Digital Recording Technology and Applications 1-2, Trend of Digital Video Technology and Digital Recording Technology", vol. 47, No. 6, 1993, pp. 801-806.
*The Institute of Television Engineers of Japan* entitled "Trend of Digital Video Transmission Technology", vol. 47, No. 10, 1993, pp. 1269-1276.
*Nikkei Electronics*, No. 586, Jul. 19, 1993, p. 66.

*Primary Examiner*—Stephen M. Baker
*Attorney, Agent, or Firm*—Evenson, McKeown, Edwards & Lenahan, P.L.L.C.

[57] ABSTRACT

An information recording and reproduction apparatus for recording and reproducing the information supplied through the transmission line is capable of protecting the copyright by limiting the reproduction of the recorded information. A main information signal supplied through the transmission line and a deadline signal attached to the main information signal and representing the reproduction deadline of the main information signal are recorded and reproduced by a recording device and a reproduction device respectively. A temporal information signal representing the date and time is acquired. The deadline signal reproduced is compared with the temporal information signal acquired. The reproduction output of the main information signal is cut off in accordance with the comparison signal produced by the comparison. In the case where the temporal information has passed the deadline, the reproduction output of the main information signal is cut off.

15 Claims, 14 Drawing Sheets

FIG. 13

| | | |
|---|---|---|
| | ID0 | INDEX SIGNAL MODE |
| RECORDING TIME INFORMATION | ID1 | RECORDING YEAR (TWO MOST SIGNIFICANT BITS) |
| | ID2 | RECORDING YEAR (TWO LEAST SIGNIFICANT BITS) |
| | ID3 | RECORDING MONTH |
| | ID4 | RECORDING DAY |
| | ID5 | RECORDING HOUR |
| | ID6 | RECORDING MINUTE |
| | ID7 | RECORDING SECOND |
| | ID8 | DEADLINE MODE |
| DEADLINE INFORMATION | ID9 | DEADLINE YEAR (TWO MOST SIGNIFICANT BITS) |
| | IDA | DEADLINE YEAR (TWO LEAST SIGNIFICANT BITS) |
| | IDB | DEADLINE MONTH |
| | IDC | DEADLINE DAY |
| | IDD | DEADLINE HOUR |
| | IDE | DEADLINE MINUTE |
| | IDF | DEADLINE SECOND |

INFORMATION RECORDING AND REPRODUCTION APPARATUS TO BE CONTROLLED BY TEMPORAL INFORMATION

BACKGROUND OF THE INVENTION

The present invention relates to an information recording and reproduction apparatus for recording and reproducing a digital information signal supplied through a transmission line, or more in particular, to an information recording and reproduction apparatus comprising a mechanism for protecting the copyright of the digital information transmitted and recorded, and an information recording and reproduction apparatus capable of reproducing the digital information signal supplied and recorded through a transmission line by temporally expanding it to the desired transmission rate at the time of reproduction.

With the progress of technology for encoding (digitizing) and compressing video and audio information and the progress of digital signal processing LSI represented by the microprocessor and the digital signal processor, melding is becoming possible between AV systems, communication systems and computer systems, with the result that a system called multimedia is closely watched. One field of multimedia includes, for example, cable-television (CATV). The CATV, which is presently supported by the analog transmission, is expected to transfer to digital transmission in the future. In that case, the information supplied (TV signals) is not only stereotype information such as the analog NTSC signal as currently experienced, but also such signals for which the data transmission rate and the image and voice quality (information compression ratio) could be freely set to some degree in accordance with viewer requirements. Further, transmission of various other digital information, as well as TV signals, is expected to become possible. The technical information relating to CATV is described, for example, in "Minor Feature: Technical Trend of Cable Television", Journal of the Institute of Television Engineers of Japan, Vol. 47, No. 8, 1993, pp. 1069–1073 and 1082–1087.

A scheme for compression based on the digital signal processing of the video (moving image) information developed so far is the MPEG (Moving Picture Image Coding Expert Group) developed using motion compensation and DCT (Discrete Cosine Transform). This scheme is opening the way for a remarkable degree of compression. Generally, the compression ratio and the quality of video information are incompatible with each other. These terms are used differently in accordance with the application and object. According to a report, the quality after compression equivalent to the VTR level for the current TV (NTSC) signal, for example, can be achieved by a transmission rate of about 1.5 Mbps including the audio signal. The TV signal with the transmission rate of about 1.5 Mbps will be called a compressed TV signal hereinafter. The technology for compressing the video information is described in "Minor Feature: Digital Recording Technology and Applications 1–2, Trend of Digital Video Technology and Digital Recording Technology", Vol. 47, No. 6, 1993, pp. 801–806, The Institute of Television Engineers of Japan, pp. 801–806, and in "Trend of Digital Video Transmission Technology", Vol. 47, No. 10, 1993, pp. 1269–1276, issued by the same organization. In the case where information with a low transmission rate as described above is transmitted using a transmission channel like CATV having a per channel bandwidth of about 6 MHz, for example, a transmission rate of about 20 to 25 Mbps is possible. The compressed TV signal described above permits transmission of information equivalent to about 12 channels including redundant data.

In the VTR for recording and reproducing digital information for the above-mentioned transmission line of CATV, etc., as disclosed in Nikkei Electronics issued Jul. 19, 1993 (No. 586), p. 66, the transmission rate of about 25 Mbps for digital recording and reproduction has become technically realizable even for consumer products with a single-head construction, and about 50 Mbps of transmission rate for such products with a multi-head configuration (two channels), thanks to the development of the high recording density technique and the increased relative speeds between the magnetic head and the tape. The use of a digital VTR recording-reproduction transmission rate of about 25 Mbps makes possible recording of the compressed TV signal described above including redundant data in as many as 12 channels. The above-mentioned qualities and data transmission rates are a specific example.

Also, in the case where video information or audio information is handled as a digital signal, the digital information can be transmitted or recorded without any special discrimination from the program and data handled by computers including video or audio or all other digital information. In other words, the transmission and recording of digital information can be processed regardless of the type of information involved. In the future, therefore, all types of digital information including the programs and data handled in computers as well as the TV signal will become capable of being supplied using the transmission line of CATV, etc.

With the above-mentioned techniques, however, in the case where a compressed TV signal representing the simultaneous transmission of a plurality of channels is recorded, except for the case where the viewer (VTR user) desires to record all the channels at the same time, effective and efficient use of the transmission line and VTR (recording medium) is impossible. More specifically, when one desired channel of the compressed TV signal is recorded, for instance, the unrequired channel information is also transmitted and recorded, so that the utilization of the transmission and VTR (recording medium) is as low as less than 10% (for the above-mentioned transmission rate). This is also the case when only a required channel is transmitted and recorded, in which case the utilization of the transmission and VTR (recording medium) is similarly less than 10%. The utilization is even lower for the transmission and recording of the programs and data handled in computer equipment low in transmission rate.

In order to solve these problems, a method may be to transmit all types of information at the same transmission rate by improving the data transmission rate of each specific information to the highest transmissible level by such means as temporal compression. In this method, the information with a low transmission rate is increased in transmission rate by temporal compression thereby to shorten the transmission time accordingly. In transmitting the above-mentioned compressed TV signal (1.5 Mbps), for example, the signal is temporally compressed by a factor of 12 thereby to convert the transmission rate to 20 to 25 Mbps including redundant data. In this way, a one-hour program is transmitted and recorded for five minutes, i.e., one twelfth of the time otherwise required.

In the information transmission by transmission rate conversion by temporal compression, however, the temporally compressed signal is required to be temporally expanded on the viewer (information receiver) side. When this temporal expansion is performed using a buffer memory (a memory for storing data temporarily) or the like, a vast amount of memory capacity is required. In the case where a 60-minute program with the transmission rate of 1.5 Mbps is temporally compressed by a factor of 1/12 and transmitted for five minutes at the transmission rate of 18 Mbps, for example, a buffer memory having at least a data quantity corresponding to 55 minutes (about 5 Gbits) is required with the 1.5 Mbps transmission rate. This involves a very large and very expensive system. Further, in accordance with the increase in the duration of a program, the capacity of the buffer memory is required to be increased. Recording the temporally-compressed information with the same transmission rate is easily realized on the viewer side using the above-mentioned digital VTR. Temporal expansion for reproduction, however, requires a vast buffer memory capacity as in the above-mentioned case.

At present, the system for supplying such information as video software or computer software (including game software) is centered on packaged media (cassette tape, disc or ROM). This software information is supplied in the form of a sale or rental (loan). In contrast, improvement in the digital information network and the diffusion of the VTR capable of recording and reproducing digital information are expected to make possible the supply of a great amount of software information through the digital information network in place of the packaged media.

The information transmission through the digital information network and the information recording/reproduction by digital VTR described above, however, are accompanied by so low a quality degradation in the process of transmission or recording/reproduction that the copyright of the software information supplied directly through such means cannot be protected. The information, such as video software, thus transmitted would constitute a sold object and therefore it would be difficult to supply such information at as low a price as the video information currently supplied in the form of a rental. In other words, if distribution of software information at prices as low as the present video rental is to be made possible, some means different from the current protection system is required to protect the copyright of the software information.

In view of this, unlike the past system of copyright protection which is centered on dubbing prevention (anti-duplication), the present invention is based on the notion that the copyrighted information is not used at the time of acquisition or recording of the software information but the use of a copyrighted information occurs at the-time of reproduction (reproduction) thereof.

SUMMARY OF THE INVENTION

A first object of the present invention is to provide an information recording and reproduction apparatus in which digital information temporally compressed can be reproduced by being expanded to its original condition along a time axis without requiring any buffer memory having a large capacity.

A second object of the invention is to provide an information recording and reproduction apparatus for recording and reproducing the information supplied through a transmission line, in which the reproduction of the information recorded can be limited with the intention of protecting a copyright therein.

In order to achieve the first object, according to the present invention, there is provided an information recording and reproduction apparatus comprising:

recording means including input means for a digital signal supplied at the time of recording, means for adding a first error detection-correction code (outer check code) to each of predetermined units of the digital signal, means for dividing the digital signal with the error detection-correction code into predetermined blocks and adding an address signal thereto, means for adding a second error detection-correction code (inner check code) to the digital signal with the address signal added thereto, modulation means for transforming the above-mentioned digitally-processed digital signal into z signal form suitable for magnetic recording and reproduction, and recording means for recording the modulated digital signal on magnetic tape; and reproduction means including tape drive means for reducing the reproduction tape drive rate as compared with the recording tape drive rate in accordance with the temporal compression ratio of the recording digital signal, means for detecting the reproduction signal from the magnetic tape, demodulation means for restoring the reproduction signal modulated at the time of recording into the original signal form, means for extracting a correct reproduction digital signal by the second error detection-correction code, memory means for storing the correct reproduction digital signal in a predetermined region on the memory in accordance with an address signal, means for correcting an error of the reproduction digital signal using the first error detection-correction code for each predetermined unit of the reproduction digital signal stored in the memory means, and temporal expansion means for reading the reproduction digital signal with the error thereof corrected at a predetermined transmission rate.

In order to achieve the first object described above, the apparatus according to the invention further comprises means for detecting the data quantity of the reproduction digital signal stored in the memory means and tape drive means for controlling the reproduction tape drive rate in accordance with the data quantity detection information from the data quantity detection means.

The aforementioned means perform the following operations for realizing the objects of the invention. The digital signal input means selectively inputs only the required information from the digital information signal supplied thereto through the transmission line. The means for adding the first and second error detection-correction codes detects the code error of the digital signal which may occur in the process of recording and reproduction and generates an error detection-correction code for rightly correcting the error data. The means for adding an address signal generates an address signal for clarifying the time series of the digital signals reproduced. The modulation means subjects the recording digital signal to a modulation such as 8–10 conversion suitable for magnetic recording and reproduction. The recording means amplifies the modulated recording digital signal to a level suitable for magnetic recording and records the signal on the magnetic tape by a magnetic head. The tape drive means of the reproduction system reduces the reproduction tape drive rate as compared with the recording tape drive rate in accordance with the temporal compression ratio of the recording digital signal to thereby perform general temporal expansion. The reproduction signal detection means detects the signal recorded in the magnetic tape using a magnetic head. The demodulation means converts the digital signal modulated at the time of recording into the original signal form. The reproduction digital signal extraction means detects only the correct digital signal by detecting an error using the error detection-correction code added at the time of recording. The address signal detection means clarifies the sequence off the reproduced digital signals on the time axis by detecting the address signals. The memory means stores the reproduction digital signals sequentially in accordance with the address signals. The error correction means corrects an error of the reproduction digital signal stored in the memory means by a predetermined unit using the error detection-correction code. The temporal expansion means reads out the reproduction digital signal with the error thereof corrected at a predetermined transmission rate.

The data quantity detection means detects the data quantity of the reproduction digital signal stored in the memory means. The tape drive means controls the reproduction tape drive rate in accordance with the data quantity detection information from the data quantity detection means and thus makes possible continuous digital signal output without any data shortage or overage using a small-capacity memory when outputting the digital signal at the desired transmission rate at the time of reproduction.

In these operations performed by the above-mentioned means, the temporally-compressed digital information is recorded and reproduced in such a manner that the digital information expanded into the original condition along the time axis can be reproduced at the desired transmission rate without a vast capacity of buffer memory.

In order to achieve the above-mentioned second object, according to the present invention, there is provided an information recording and reproduction apparatus comprising means for recording a main information signal supplied through the transmission line and a deadline signal attached to the main information signal for indicating the reproduction deadline of the main information signal, means for reproducing the main information signal and the deadline signal, means for generating or acquiring a temporal information signal including the date and time, means for comparing the deadline signal reproduced from the reproduction means with the temporal information signal detected by the temporal information generating means, and means for cutting off an output of the main information signal in accordance with a comparison signal from the comparator means, wherein in the case where a value of the temporal information signal is larger than a value of the deadline signal, the signal cut-off means cuts off the output of the main information signal.

The information recording and reproduction apparatus under consideration further comprises means for generating display information indicating that the reproduction deadline for the main information signal has passed in the case where the cut-off means cuts of the main information signal.

The following operations are performed by the above-mentioned means. The recording means records the main information signal supplied through the transmission line and the deadline signal attached to the main information signal for indicating the reproduction deadline of the main information signal. The reproduction means reproduces the recorded main information signal and the deadline signal. The temporal information generating means generates a signal representing temporal information such as date and time by means of a timer or the like for counting a stable clock or by detecting the temporal information supplied through the transmission line. The comparator means compares the deadline signal reproduced by the reproduction means with the temporal information signal generated or detected by the temporal information generating means to see whether the temporal information (time, including the date or the like) exceeds the deadline at the time of reproduction and supplies a comparison signal to the cut-off means. The signal cutoff means cuts off the output of the reproduced main information signal in the case where the temporal information exceeds the deadline in accordance with the comparison signal generated from the comparator means. The above-mentioned configuration and operation sets the reproduction deadline of the main information signal supplied through the transmission line, and in the case where the deadline is exceeded, the reproduction of the main information signal becomes impossible, thereby protecting the copyright of the transmitted information signal.

Also, means for generating display information indicates that the reproduction deadline of the main information signal is exceeded and therefore the main information signal cannot be reproduced. This display information indicating means prevents the impossibility of reproduction from being incorrectly assumed to be a malfunction of the apparatus, thus contributing to the operating convenience of the apparatus.

BRIEF DESCRIPTION OF THE DRAWINGS

FIG. 13 is a diagram showing an example configuration of an index signal.

DESCRIPTION OF THE PREFERRED EMBODIMENTS

Figure 2:
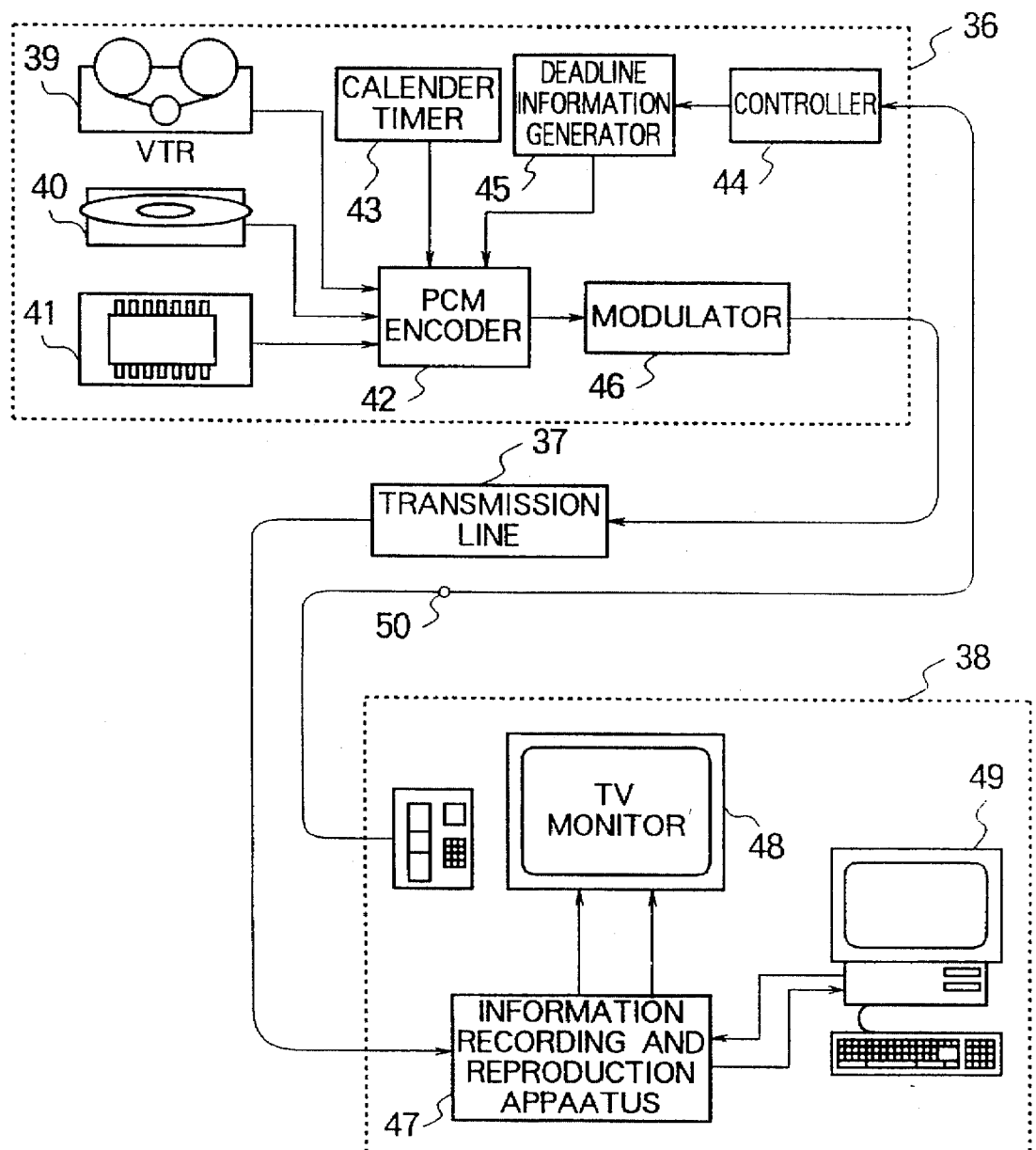
FIG. 2 is a configuration diagram showing the operating environment of a helical scan type recording and reproduction apparatus according to the invention.

Embodiments of the invention will be described below in detail with reference to the accompanying drawings. First, prior to explaining in detail an information recording and reproduction apparatus according to the invention, a brief description will be made of the operating environment of the apparatus with reference to FIG. 2. FIG. 2 shows the operating environment of an information recording and reproduction apparatus according to the invention. In FIG. 2, the section defined by the dashed line 36 represents a transmitting office system for supplying a digital information signal. Numeral 37 designates a transmission line for the digital information signal. The section defined by the dashed line 38 represents a viewer (user) system having an information recording and reproduction apparatus system according to the invention. The transmitting office 36 comprises a digital VTR 39 and a disc unit 40 or a semiconductor recording and reproduction apparatus 41 including a large-capacity memory, for example, for compressing the information and time axis of the digital information signal (main digital information signal) using the MPEG scheme or the like and supplying the resultant signal to a PCM encoder 42 at a predetermined transmission rate. The PCM encoder 42, in order to prevent the adverse effect of a code error generated in the course of transmission of the digital information signal, generates and adds an error detection and correction code and a sync signal. At the same time, temporal information such as the date and time (hereinafter referred to as "the date/time information") supplied from a calendar timer circuit 43 and deadline information for determining a deadline of the transmission information supplied from a deadline information generating circuit 45 are added to the transmission information as an index signal. The deadline information is not determined uniquely, rather the information desired by the information receiver (user supplied through a telephone line 50 or the like is detected and decoded by a controller 44 to determine the deadline in response to a demand from the information receiver. Generally, the longer the deadline, the higher the price is set for the supplied information. The information desired by the user may of course be transmitted through the transmission line 37 which may be a bidirectional transmission line such as a bidirectional CATV transmission line as well as through the telephone line 50. The digital information signal with the redundant data added thereto at the PCM encoder 42 is applied to a modulation circuit 46. The modulation circuit 46 outputs the digital information signal as converted into an efficient signal form such as a multi-valued QAM signal suited to the characteristics of the transmission line 37 in the next stage. The digital information signal supplied through the transmission line 37 is expanded to conform to the original time axis at the information recording and reproduction apparatus 47 according to the invention. In the case where the transmission information is a video or audio signal, the information is expanded defrozen), converted into an analog signal and output to a TV monitor 48. In the case where the transmission information signal is a program or data used for computer equipment or the like, on the other hand, the signal is reproduced at a transmission rate suited to external equipment by means of an external command (control signal), and supplied to a digital information unit 49 such as a computer. Whether the transmitted digital information signal is a video/audio signal or a program or data signal can be easily determined by detecting the index signal added at the PCM encoder 42.

Figure 1:
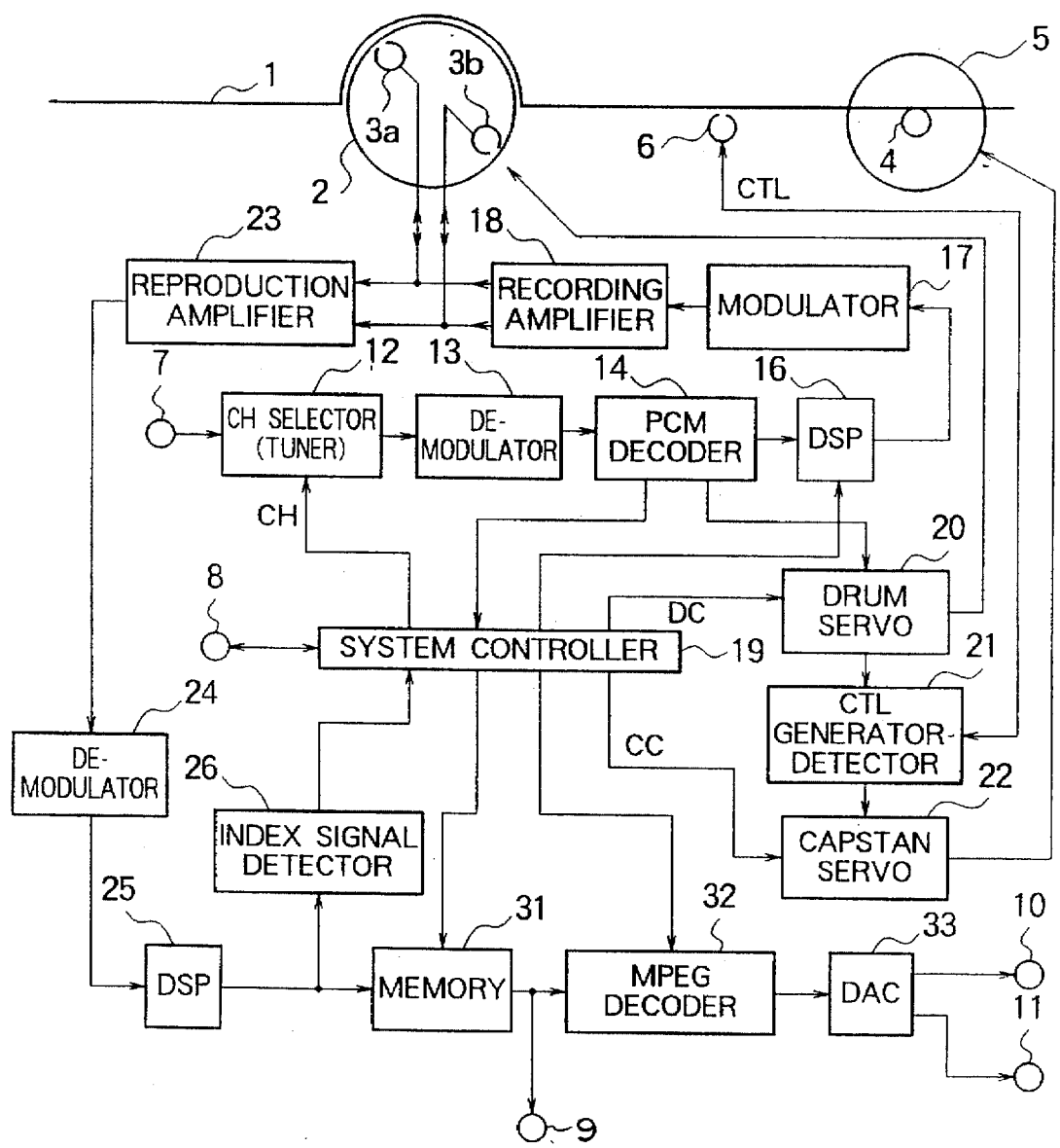
FIG. 1 is a block diagram showing the configuration of a helical scanning type recording and reproduction apparatus according to the present invention.

An information recording and reproduction apparatus for achieving the first object of the invention will be described in detail with reference to FIG. 1. FIG. 1 is a block diagram showing the configuration of an information recording and reproduction apparatus to which the present invention is applied. In FIG. 1, reference numeral 1 designates a magnetic tape, numeral 2 a drum (including a drum motor), numerals 3a, 3b magnetic heads, numeral 4 a capstan, numeral 5 a capstan motor, numeral 6 a CTL head, numerals 7 to 11 signal input or output terminals, numeral 12 a channel selector (tuner), numeral 13 a demodulation circuit, numeral 14 a PCM decoder, numeral 16 a digital signal processor (hereinafter referred to as "DSP"), numeral 17 a modulation circuit, numeral 18 a recording amplifier, numeral 19 a system controller, numeral 20 a drum servo circuit, numeral 21 a CTL generating/detection circuit, numeral 22 a capstan servo circuit, numeral 23 a reproduction amplifier, numeral 24 a demodulation circuit, numeral 25 a DSP, numeral 26 an index signal detection circuit, numeral 31 a memory, numeral 32 an MPEG decoder (information expansion circuit), and numeral 33 a D/A converter. The recording and reproduction operations will be explained below along with the flow of signals.

Figure 3:
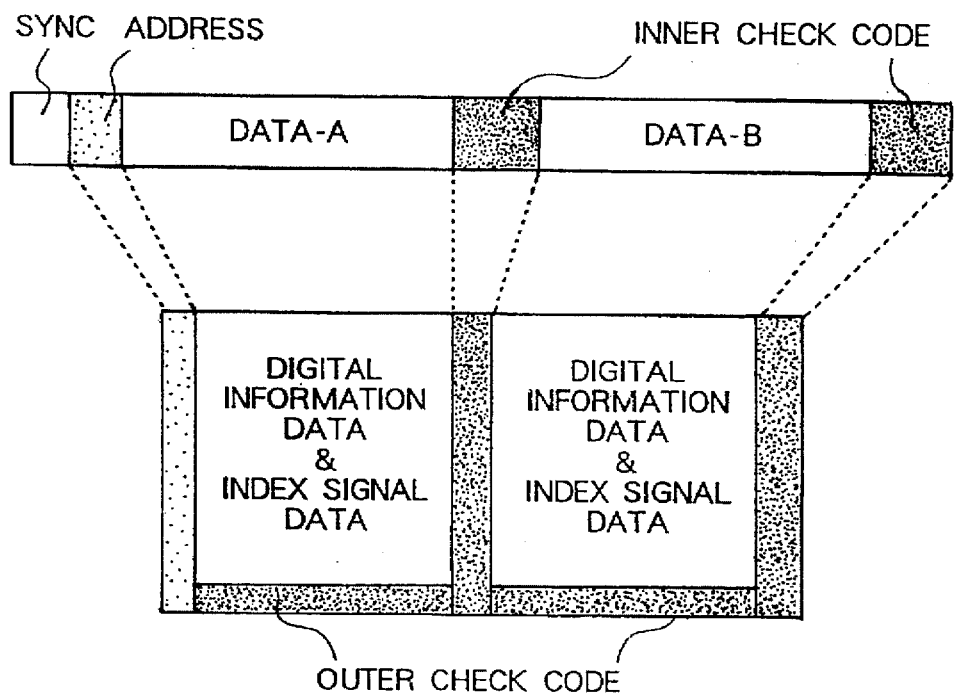
FIG. 3 is a diagram showing the block configuration and the error detection and correction code structure of the recording information signal.

In FIG. 1, the input information signal supplied through the input terminal 7 is applied to the channel selector 12. The channel selector 12 selects the information signal of the desired channel in accordance with the channel-designating signal CH supplied from the system controller 19 and supplies the selected signal to the demodulation circuit 13. The channel-designating signal CH is set by the user command signal supplied through the input/output terminal 8. The demodulation circuit 13 demodulates the input information signal modulated into a signal form suitable for the transmission line 37, converts the input demodulation signal into the original digital signal, and supplies the resultant signal to the PCM decoder 14. The PCM decoder 14 detects and corrects the error of the digital information signal input and supplies the resultant digital information signal to the DSP 16 in the next stage, while at the same time detecting the index signal and supplying it to the system controller 19. Further, a sync signal for detecting the data block structure is separated and supplied to the drum servo circuit 20. The system controller 19 supplied with the index signal selects the data required for reproduction such as the information representing the type of the recording information signal or the information on the temporal compression ratio from among the index signals and supplies the selected signal to the DSP 16 and also to the display system (not shown) through the input/output terminal 8. The information on the index signal is thus indicated to the user. The DSP 16 converts the digital information signal supplied from the PCM decoder 14 and the index signal required for reproduction supplied from the system controller 19 into a signal form suitable for magnetic recording and reproduction. More specifically, in order to deal with the code error in magnetic recording and reproduction operation, the data are divided into blocks, address data are added, and also a strong error detection and correction code such as an interleave or Reed-Solomon code are added. An example block structure of the recording information signal is shown in FIG. 3. The digital information and the index signal applied to the DSP 16 are arranged as shown at the lower part of FIG. 3 with the information recorded in one track (the track-formed by one scan of the magnetic head) as a unit. After an outer check code is added in a vertical direction, an inner check code is added in horizontal direction. The inner check code is generated, as shown in the upper part of FIG. 3, for both the data A with address information and the data B. As described above, the recording information signal with the error detection and correction code added thereto is applied to the modulation circuit 17 with the block sync signal (hereinafter referred to as the "sync") indicating the block head before the address information. The modulation circuit 17 modulates the recording information signal into a digital signal of 8–10 conversion, for example, suitable for magnetic recording and applies it to a recording amplifier 18 as a serial signal. The recording amplifier 18 amplifies the recording digital signal to a level suitable for magnetic recording and records it on the magnetic tape through magnetic heads 3a, 3b with an optimal recording rent.

Figure 4:
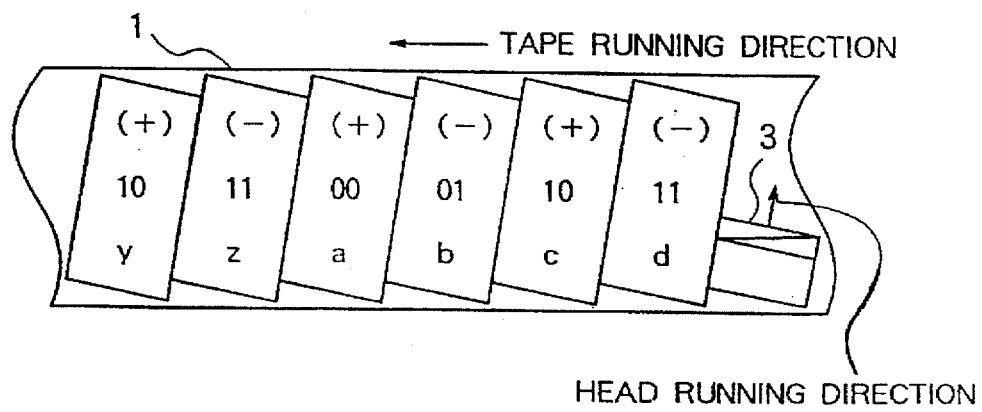
FIG. 4 is a diagram showing an example track pattern of recording by the apparatus according to the invention.

In the case where the error detection and correction signal is generated with the information recorded in a track as a unit as described above, generally, the address signal added to each sync block is also generated as an address value with the information recorded in a track as a unit. According to this embodiment, however, the address value is generated with the information recorded in four tracks as a unit. More specifically, while address values 0 to M−1 are commonly assigned to the number M of sync blocks making up a track, the present embodiment using four tracks as a unit is such that the address values 0 to M−1 are assigned to the blocks of the first rack, the address values M to 2M−1 the blocks of the second track, the address values 2M to 3M−1 to the blocks of the third track, and the address values 3M to 4M−1 to the blocks of the fourth track. This is easily realized by adding two bits to each address generated per track and using a 2-bit counter for counting every track period with two bits as 00, 01, 10, 11, 00 and so on. FIG. 4 shows the value of the two bits added in that way, and a model of the track pattern recorded. The address generation of every four track periods described above incorrectly in the reproduction data correctly in the case reproduction with the tape speed reduced as compared with that for the recording, and will be described in more detail later with reference to the operation of the DSP 25 at the time of reproduction. According to this embodiment, the temporal compression ratio of the recording digital information is set to 1/12.

Figure 5A:
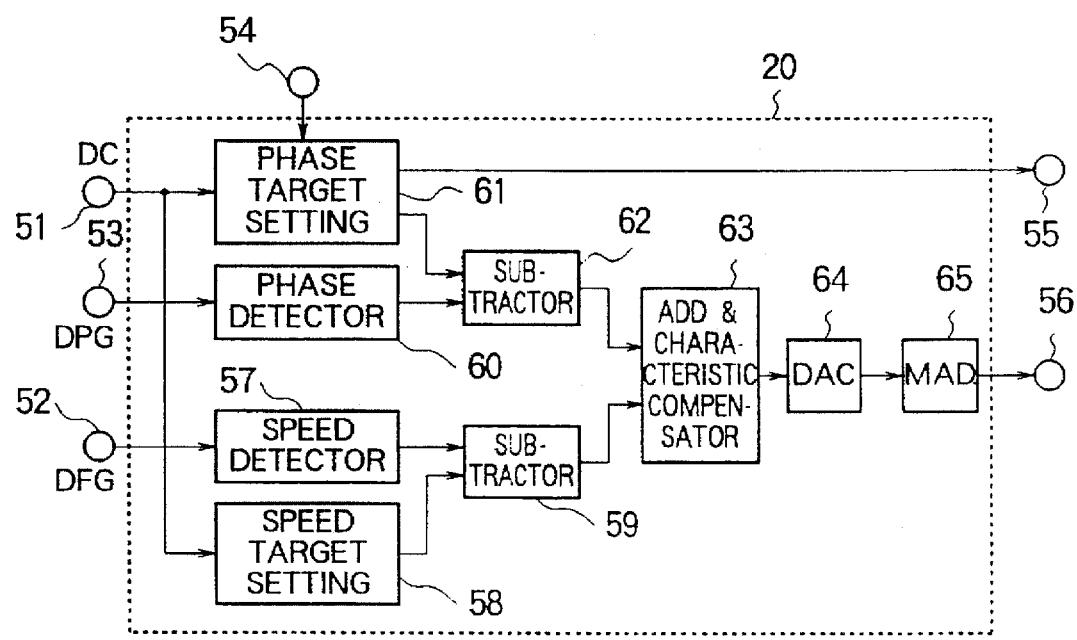
FIGS. 5A and 5B are block diagrams showing the configuration of a drum servo circuit and a capstan servo circuit respectively.
Figure 5B:
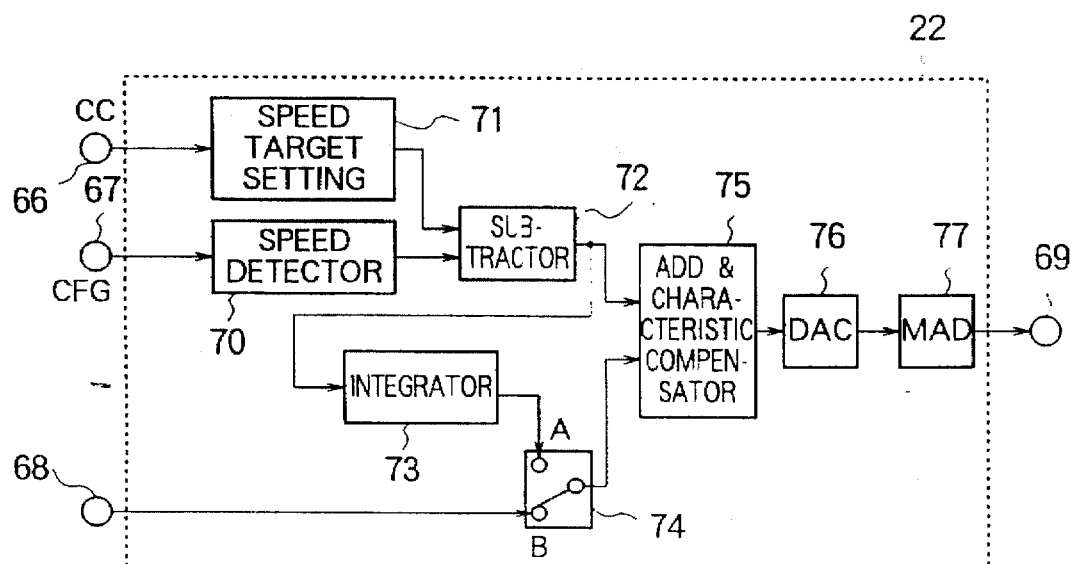

Now, explanation will be made about the servo operation of the capstan 4 and the drum 2 at the time recording. According to this embodiment, the helical scan with two heads, 180 degrees opposed to one another, using azimuth heads is taken as an example. The drum rotational frequency is set to three times the frame frequency (about 5400 rpm, that is the rotational frequency three times that of the home VTR) of the TV signal in order to secure the recording transmission rate of about 25 to 30 Mbps. As a result, three tracks are formed during the field period of the TV signal. The drum 2 and the capstan 4 are controlled by a drum servo circuit 20 and a capstan servo circuit 22 in accordance with the drum and capstan command signals DC, CC supplied from the system controller 19. FIG. 5 is a block diagram showing the internal configuration of the drum servo circuit 20 and the capstan servo circuit 22. In FIGS. 5A and 5B, the section defined by the dashed line is the drum servo circuit and the section defined by the dashed line 22 represents the capstan servo circuit. Numerals 51–54 and 66–68 designate input terminals, numerals 55, 56, 69 output terminals, numerals 57, 70 speed detection circuits, numerals 58, 71 speed target setting circuits, numerals 59, 62, 72 subtraction circuits, numeral 60 a phase detection circuit, numeral 61 a phase target setting circuit, numerals 63, 75 add and characteristic compensation circuits, numerals 64, 74 D/A converters, numerals 65, 77 motor driver amplifiers (hereinafter referred to as "MDA"), numeral 73 an integrating circuit, and numeral 74 a switch.

The drum servo circuit will be described. In FIG. 5A, the DFG (Drum Frequency Generator) signal supplied through the input terminal 54 is applied to the speed detection circuit 57. The mechanism for generating the DFG signal, though not shown, generates a frequency signal in proportion to the rotational frequency of the drum 2. The speed detection circuit 57 detects the rotational speed of the drum 2 by measuring the period of the DFG signal and applies the speed detection information to the subtraction circuit 59. The drum command signal DC supplied through the input terminal 51 from the system controller 19 is applied to the speed target setting circuit 58 and the phase target setting circuit 61. The speed target setting circuit 58 generates a target of the rotational speed of the drum 2 three times higher than the frame frequency in accordance with the drum command signal DC. The subtraction circuit 59 subtracts between the speed detection information and the speed target information, and applies the difference therebetween to the add and characteristic compensation circuit 63 as speed error information. On the other hand, the DPG (Drum Phase Generator) signal supplied through the input terminal 53 is applied to the phase detection circuit 60. The DPG signal, though not shown, is a phase signal synchronized with the rotation of the drum 2 and having a predetermined phase relationship with the rotation of the magnetic head 3a or 3b. The phase detection circuit 60 detects the rotational phase of the drum 2 by detecting the phase of the DPG signal and applies the resulting phase detection information to the subtraction circuit 62. The phase target setting circuit 61 generates phase target information from the sync signal of the input information signal supplied from the PCM decoder 14 through the input terminal 54 at the time of recording, and applies the phase target information to the subtraction circuit 62. Also, the phase target setting circuit 62 applies through the output terminal 55 to the CTL generation and detection circuit 21 a control signal (hereinafter referred to as "the CTL signal") of a frequency obtained by multiplying the rotational frequency of the drum 2 in synchronism with the rotational phase of the drum 2. According to this embodiment, the frequency multiplication of the CTL signal is set equal to the temporal compression ratio of the recording information signal, and therefore the frequency thereof is 1080 Hz (30 Hz×3×12). The subtraction circuit 62 subtracts between the phase detection information and the phase target information, and applies the phase error information making up the difference therebetween to the add and characteristic compensation circuit 63. The add and characteristic compensation circuit 63 adds the speed error information and the phase error information, while at the same time performing the filtering for characteristic compensation, such as the phase delay compensation, in such a manner as to attain the desired servo characteristic, and applies the result to the D/A converter 64. The D/A converter 64 converts the drum control signal supplied from the add and characteristic compensation circuit 63 into an analog signal and supplies the analog signal to the MDA 65. The MDA 65 power-amplifies the drum control signal and applies the amplified signal as a drum drive signal to the drum 2 through the output terminal 56, to thereby rotate the drum 2 at a predetermined speed and a predetermined phase. In this way, the phase target information is generated using the sync signal of the input information signal in order to control the rotation of the drum 2 in accordance with the transmission rate of the input information signal to thereby secure the recording of the input information signal without any overage or shortage.

Now, the capstan servo operation will be explained. In FIG. 5B, the CFG (Capstan Frequency Generator) signal supplied through the input terminal 67 is applied to the speed detection circuit 70. Though not shown, the CFG signal is generated as a frequency signal proportional to the rotational frequency of the capstan 4 (like the DFG signal). The speed detection circuit 70 detects the rotational speed of the capstan 4 by measuring the period of the CFG signal, and applies the resulting speed detection information to the subtraction circuit 72. The capstan command signal CC supplied through the input terminal 66 from the system controller 19 is applied to the speed target setting circuit 71. The speed target setting circuit 71 generates a rotational speed target of the capstan 4 in accordance with the capstan command signal CC, and applies the speed target information to the subtraction circuit 72. The subtraction circuit 72 subtracts between the speed detection information and the speed target information, and supplies the speed error information making up the difference to the add and characteristic compensation circuit 75 and the integrating circuit 73. The integrating circuit 73 sequentially accumulates the speed error information supplied from the subtraction circuit 72 and thus generates speed error integration information. This speed error integration information is supplied to the switch 74. The switch 74 is closed to the A input terminal side at the time of recording for supplying the speed error integration information output from the integrating circuit 73 to the add and characteristic compensation circuit 75. The add and characteristic compensation circuit 75 adds the speed error information and the speed error integration information to each other while at the same time performing the filtering operation for characteristic compensation such as phase delay compensation in such a manner as to achieve the desired servo characteristic, and supplies the result to the D/A converter 76. The D/A converter 76 converts the capstan control signal supplied from the add and characteristic compensation circuit 75 into an analog signal and supplies the analog signal to the MDA 77. The MDA 77 power-amplifies the capstan control signal and supplies the amplified signal as a capstan drive signal to the capstan motor 5 through the output terminal 69. As a result, the capstan 4 is rotated at a predetermined speed and the magnetic tape 1 is driven at a predetermined speed. The integrating circuit 73 is added to a speed system (proportional control system) to provide an integrating control system in order to make the normal speed error zero.

In the above-mentioned operation during recording, the CTL signal supplied from the phase target setting circuit 61 of the drum system is applied to the CTL generating-detection circuit 21 shown in FIG. 1, where the CTL signal is converted to a signal level suitable for magnetic recording. The resulting signal is applied to the CTL head 6 and recorded in the linear track on the magnetic tape. The foregoing is the operation of the apparatus according to the invention in the recording mode. Now, the important operation during reproduction according to the invention will be described.

Figure 6:
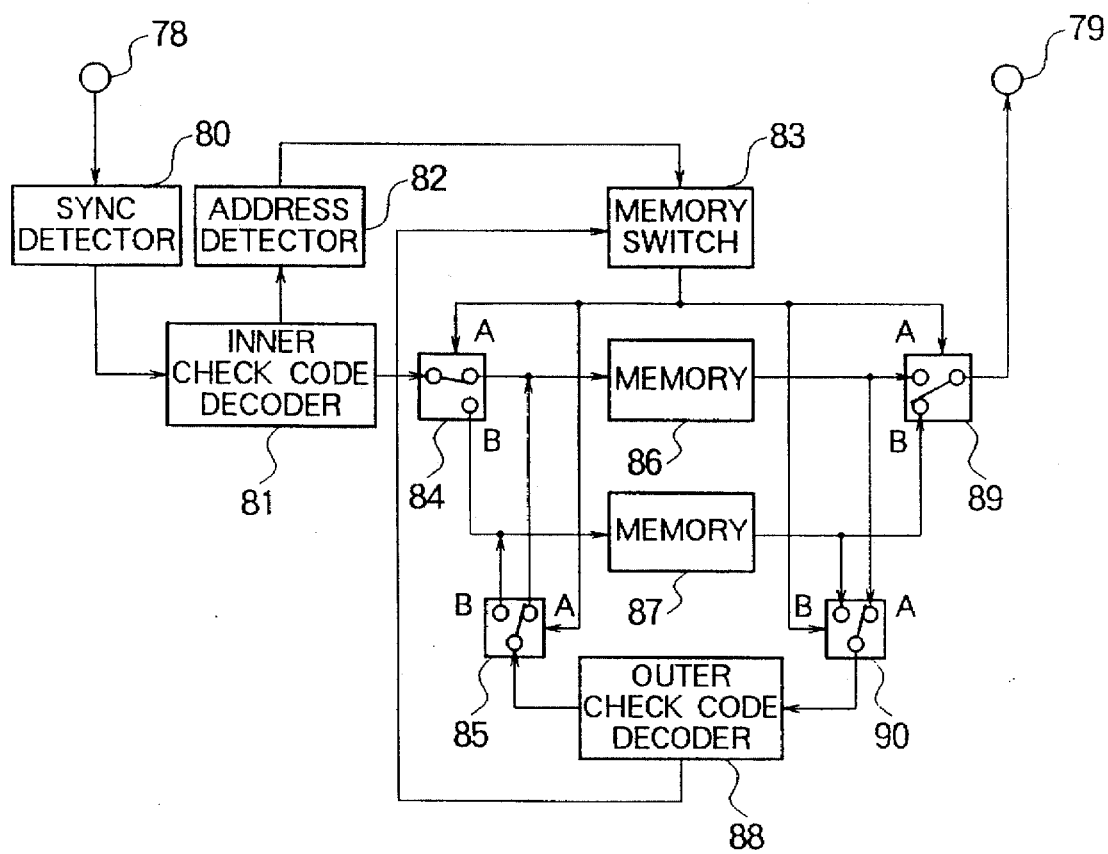
FIG. 6 is a block diagram showing the configuration of a digital signal processor of a reproduction signal processing system.

In FIG. 1, the reproduction signal reproduced from the magnetic tape 1 on the magnetic head 3a or 3b is amplified sufficiently at the reproduction amplifier 23 and supplied to the demodulation circuit 24. The demodulation circuit 24 equalizes the waveform of the reproduction information signal supplied thereto, extracts the clock component, and strobes the reproduction data using the clock to thereby convert it into a logic signal. The demodulation process is performed in a manner opposite that of the recording, and the reproduction digital signal thus demodulated is supplied to the DSP 25. The DSP 25 generally operates to detect and correct the error of the reproduction signal to de-interleave on the basis of the address information to restore the original data sequence, and to supply the resultant signal to the memory circuit. The operation of the DSP 25 will be explained in detail with reference to FIGS. 6 to 8. FIG. 6 is a block diagram showing a specific configuration example of the DSP 25. In FIG. 6, numeral 78 designates an input terminal, numeral 79 an output terminal, numeral 80 a sync c detection circuit, numeral 81 an inner check code decoder, numeral 82 an address detection circuit, numeral 83 a memory switching circuit, numerals 84, 85, 89, 90 switches, numerals 86, 87 memories, and numeral 88 an outer check code decoder. In FIG. 6, the reproduction digital signal supplied through the input terminal 78 is applied to the sync detection circuit 80. The sync detection circuit 80 detects the sync signal from the reproduction digital signal supplied as serial data, and thus clarifies the block structure shown in the upper part of FIG. 3. The reproduction digital signal segmented into blocks is applied to the inner check code decoder 81. The inner check code decoder 81 detects and, if possible, corrects the error of the reproduction digital signal using the inner check code by block. The reproduction digital signal determined to be correct by the inner check code decoder 81 is applied to the switch 84 and the address detection circuit 82. The switch 84 distributes the reproduction digital signal between the memory 86 and the memory 87 in accordance with the control signal supplied from the memory switching circuit 83. The memories 86 and 87 each have a capacity to store the equivalent of one track of the reproduction digital signal making up a unit for error correction by an outer check code. The address detection circuit 82 extracts the address signal from the reproduction digital signal and applies the address information to the memory switching circuit 83. The memory switching circuit 83 controls the switching operation of the switches 84, 85, 89 and 90 in accordance with the address information.

Figure 7:
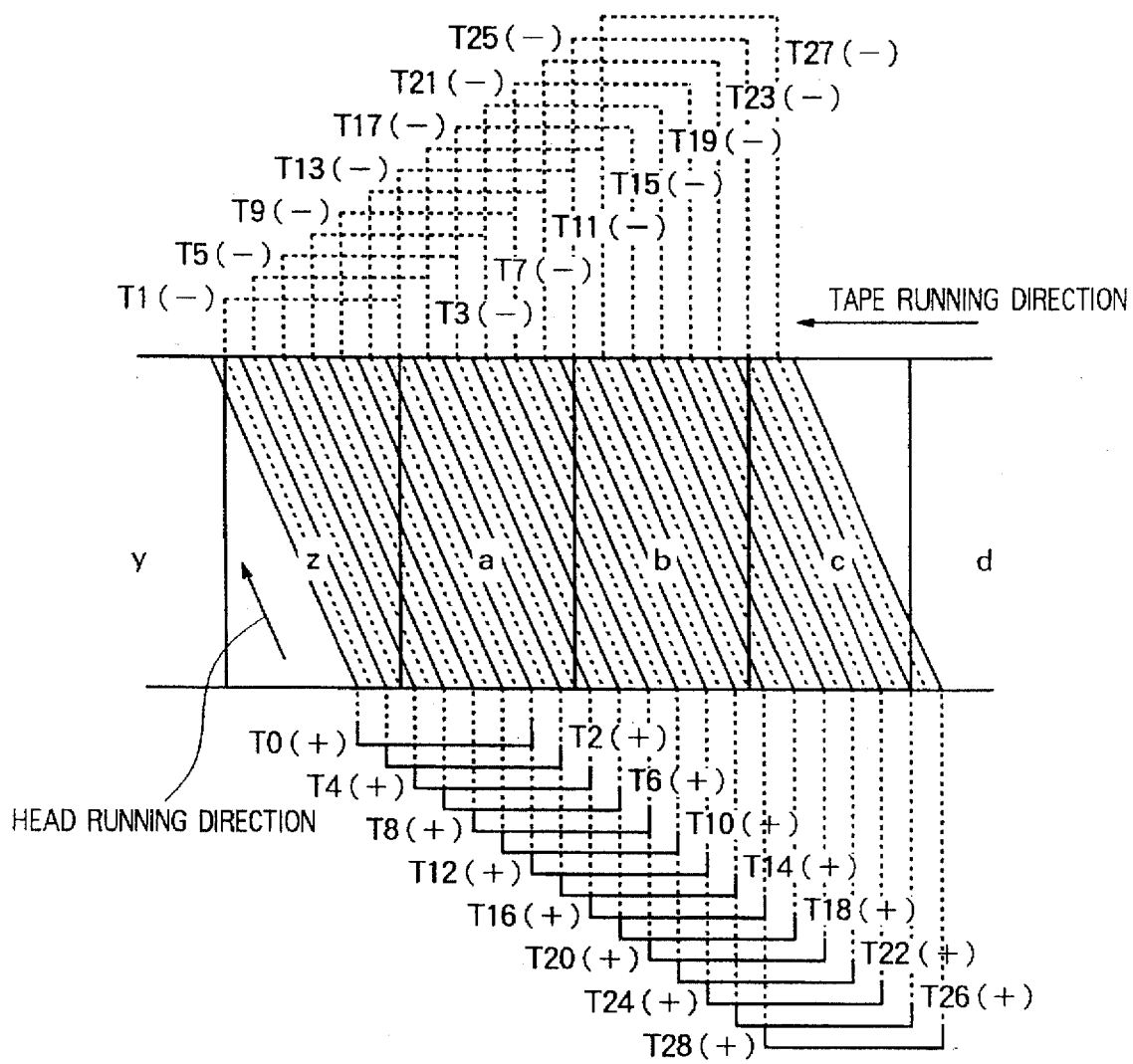
FIG. 7 is a diagram showing a recording track pattern and the head scanning locus associated with a 1/12 tape drive rate.
Figure 8:
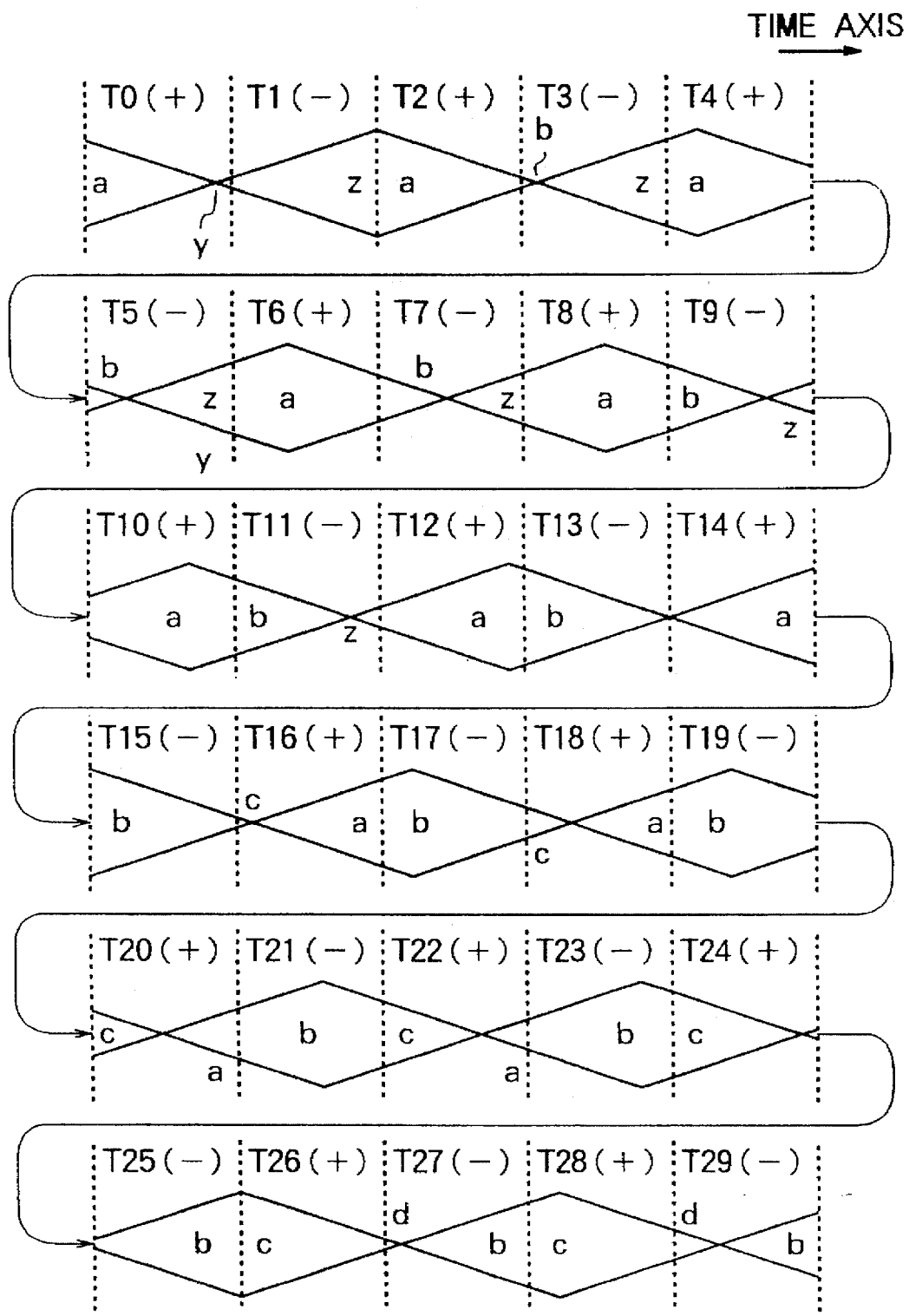
FIG. 8 is a diagram showing a reproduction envelope signal waveform for the reproduction operation with the 1/12 tape drive rate.

The memory switching operation, in actual reproduction conditions, will be explained below in detail with reference to FIGS. 7 and 8. FIG. 7 is a model diagram showing an example or the magnetic head scan locus for reproduction at 1/12 speed. In FIG. 7, the segments denoted alphabetically represent tracks, and the diagonal lines on the tracks designate the scanning locus of the magnetic head. In this diagram, the width of the magnetic head is set equal to the track width, and the scan locus of the magnetic head moves from T0(+), T1(−), T2(+), . . . , T26(+), T27(−) in that order. The signs (+) and (−) designate the azimuth angle of the scan head. According to this embodiment, the tape speed for reproduction is set to 1/12 of the recording tape speed, and therefore the tape is fed at a rate equivalent to one track during 12 head scanning periods. FIG. 8 is a diagram showing a model of a reproduction envelope signal waveform for the reproduction conditions shown in FIG. 7. Assume that the information on track a is to be written into the memory 86. The switch 84 is closed to terminal side A so that the memory 86 is supplied with a reproduction digital signal with "00" as the two track ID bits of the address signal in the correctly-reproduced reproduction digital signal by block. During the T2(+) period shown in FIG. 8, the correct digital signal reproduced from the lower part of track a is supplied to the memory 86. In similar fashion, during the T4(+) period, T6(+) period and T8(+) period in that order, the correct digital signals reproduced from the lower part of track a toward the upper part of track a are sequentially supplied to the memory 86. In this case, the same digital signal is supplied to the memory 86 in duplicate. Unless the digital signal thus supplied is an error signal, however, the duplicate write poses no problem. Rather, it may have the advantage of facilitating the memory control. The block for which a correct digital signal has not been finally written is determined as an error, which is corrected subsequently by an outer check code. As described above, while the information of track a is written into the memory 86, the other memory 87 moves from the process of writing the information of track z, to the process of correcting the error of the reproduction digital signal of track z by an outer check code, to the process of collective transfer of the reproduction digital signals to the memory 31 shown in FIG. 1 and then to the process of writing the information of track b.

The important point to be considered in the signal processing transfer described above is the timing of starting the error correction by outer check code 88. According to the embodiment under consideration, this timing is set in such a way that the updating of a reproduction digital signal is completed and the error correction thereof with an outer check code 88 is started at the point in time when the particular reproduction digital signal is reproduced from the following track but one (second following track), and at least a block of the signal is identified correct as a result of error detection with the inner check code 81. The reproduction digital signal reproduced from the following track but one (second following track) is determined to be correct by means of detecting a two-bit address signal for track identification. Therefore, the correct reproduction digital signal for track b is obtained for the first time during the period of T11(−) shown in FIG. 8. Upon detection of the two-bit address signal "01" for track identification, the switches 85 and 90 shown in FIG. 6 are closed to the B terminal side in accordance with the control signal supplied from the memory switching circuit 83. The outer check code decoder 88 is connected to the memory 87 for correcting the error of the signal written in the memory 87, i.e., the reproduction digital signal from track z, by an outer check code. Upon completion of error correction by the outer check code, the completion signal is applied to the memory switching circuit 83. As a consequence, the memory switching circuit 83 generates a control signal for closing the switch 89 to the B terminal side, which signal is supplied to the switch 89. The error correction complete digital signal for track z, written in the memory 87, is applied through the switch 89 and the output terminal 79 to the memory circuit 31 shown in FIG. 1. When transfer of the reproduction digital signal for track z is completed, the memory 87 is written sequentially with the information reproduced from track b from the period T13(−) in FIG. 8. In similar fashion, the error correction by the outer check for the reproduction digital signal from track a written in the memory 86 is started, for example, at the timing of detecting the two-bit address signal "10" for track identification reproduced from track c during the period T22(+) in FIG. 8. In the process, the switches 85 and 90 are closed to the A terminal side. Subsequently, the digital processing by track is sequentially performed in the above-mentioned manner at the timing of detecting the reproduction digital signal (two-bit address signal for track identification) reproduced from each following track but one (second following track).

The memory circuit 31 supplied with the reproduction digital signal error-corrected by the processing of the DSP 25 supplies a reproduction digital signal with a predetermined transmission rate, say, 1.5 Mbps to the MPEG decoder 32 and the output terminal 9 in accordance with the output transmission rate designation signal supplied from the system controller 19. In the case where the reproduction signal is a compressed signal of MPEG scheme, the MPEG decoder 32 defreezes the compression of (expands) the reproduction digital signal by decoding in accordance with the reproduction digital signal ID signal and the decode scheme setting signal supplied from the system controller 1, and supplies a digital video signal and a digital audio signal to the D/A converter 33. The D/A converter 33 converts the supplied digital video and audio signals into analog signals, which are respectively output through the output terminals 10 and 11. In the case where the reproduction digital signal is a data signal used for computer equipment or the like, by contrast, the signal is converted into a predetermined transmission rate and output through the output terminal 9.

The setting signal and the ID signal supplied to the memory circuit 31 and the MPEG decoder 32 from the system controller 19 are generated by detecting the index signal contained in the reproduction digital signal by the index signal detection circuit 26 and decoding it by the system controller 19.

The servo control for reproduction will be explained with reference to FIG. 5. First, the drum servo control will be described. In FIG. 5A, the speed control of the drum 2 is performed, like the speed control for recording described above, by generating speed error information from a speed detection circuit 57, a speed target setting circuit 58 and a subtraction circuit 59. For phase control, on the other hand, in view of the fact that the sync signal for the input digital information signal is not supplied during reproduction, a phase target setting circuit 61 shown in FIG. 5A generates a phase reference signal of a frequency three times higher than the frame frequency for a TV signal using a stable clock generated by a crystal oscillator or the like not shown). A phase target signal is generated by this phase reference signal and is applied to the subtraction circuit 62. The subtraction circuit 62 subtracts between the phase detection information and the phase target information, and applies the difference, i.e., the phase error information, to an add and characteristic compensation circuit 63. The processing in the add and characteristic circuit 63 and subsequent circuits are similar to those of the corresponding circuits for the recording operation.

The tape drive control, i.e., the capstan control during reproduction requires the tape speed to be reduced in accordance with the temporal compression ratio of the digital information signal containing the recorded tape speed.

In FIG. 5B, the speed detection circuit 70 detects the rotational speed of the capstan 4 by measuring the period of the CFG signal and supplies the resultant speed detection information to the subtraction circuit 72. The speed target setting circuit 71 generates a rotational speed target for the capstan 4 in accordance with the capstan command signal CC supplied through the input terminal 66 from the system controller 19, and supplies the particular speed target information to the subtraction circuit 72. The system controller 19 detects the temporal compression ratio information of the reproduction digital signal from a reproduction index signal, sets a speed target for the capstan 4 from the same information, and supplies it as a capstan command signal CC to the speed target setting circuit 71. As a result, in the case where the temporal compression ratio of the reproduction digital signal is $1/12$, for example, the tape speed target for reproduction is set to $1/12$ of the recording tape speed.

In order to set the reproduction tape speed uniformly to $1/12$ of the tape speed for recording, a speed integration control system is required. This is implemented by use of a reproduction CTL signal. For the speed integration control with the reproduction CTL signal, in the CTL generating-detection circuit 21 in FIG. 1, the reproduction CTL signal detected from the CTL head 6 is compared in phase with a phase reference signal having a frequency three times higher than the frame frequency for the TV signal generated using a stable clock at the phase target setting circuit 61 shown in FIG. 5A thereby to generate a phase error signal. The phase error signal derived from the reproduction CTL signal is applied through the input terminal 68 to the switch 74 as shown in FIG. 5B. The switch 74 is closed to the B terminal side during reproduction operation, and applies the phase error signal generated from the reproduction CTL signal to the add and characteristic compensation circuit 75. This operation controls the tape speed in such a manner that the reproduction CTL signal frequency is 1/12 of the recording CTL signal frequency As explained above, according to this embodiment, the digital information signal temporally compressed and supplied through the transmission line is recorded, and this signal is reproduced at a tape speed equal to the temporal compression ratio of the recording information signal at the time of reproduction. At the same time, the signal is digitally processed with the information recorded in a track as a unit, and the timing of complete detection of the digital signal reproduced intermittently by track is determined by detecting the reproduction digital signal from the following track but one (second following track). Thus, the required digital signal can be detected by track without any drop-off. This detected digital signal by track is output at the desired transmission rate, thereby making it possible to reproduce the signal by expanding the time axis to the original scale without any large-scale buffer memory.

Although the embodiment under consideration involves the case in which the temporal compression ratio of the input (recording) digital information signal is 1/12, this temporal compression ratio may assume a different value. Also, instead of the tape speed integration control system used for reproduction, an ATF scheme with a pilot signal used for the 8-mm video camera, for example, may be employed with equal effect.

Figure 9:
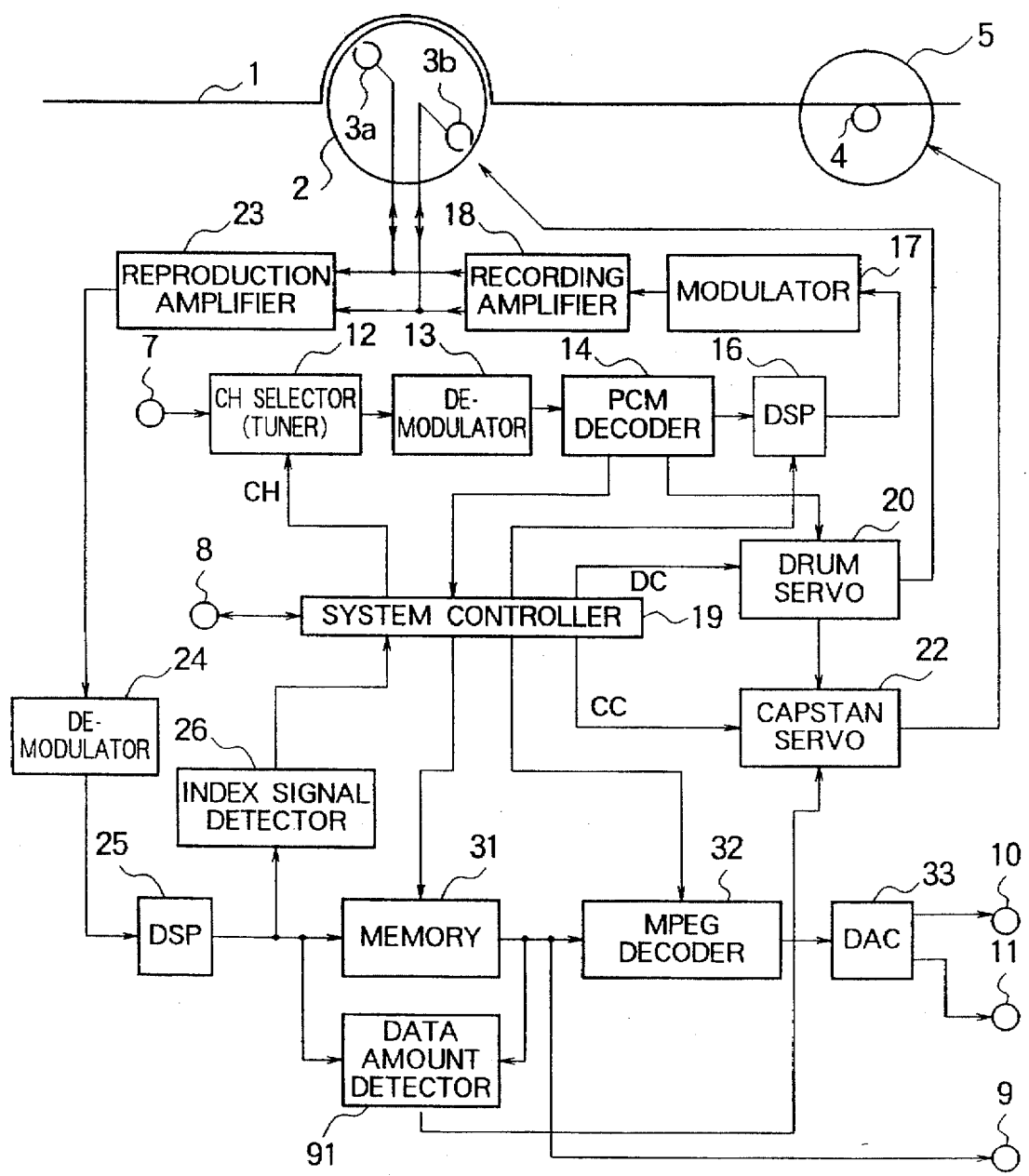
FIG. 9 is a block diagram showing the configuration of a helical scan type recording and reproduction apparatus according to the invention.

Now, a second embodiment will be described. The significant difference of the second embodiment from the first embodiment lies in the tape drive control for reproduction. Explanation will be made in detail-with reference to FIG. 9. FIG. 9 is a block diagram showing the configuration of a recording and reproduction apparatus of a helical scan type to which the present invention is applied. In FIG. 9, the same reference numerals as numerals as those used in the block diagram of FIG. 1 designate the blocks having the same or similar functions as the corresponding blocks in FIG. 9, respectively. The apparatus shown in FIG. 9 is different from that of FIG. 1 in that the CTL head 6 and the CTL generating-detection circuit 21 in FIG. 1 are eliminated while a data quantity detection circuit 91 is newly added to the circuit of FIG. 9. The tape drive control for reproduction in which the data quantity detection circuit 91 plays an important role will be explained in detail.

According to the first embodiment, the tape drive control for reproduction is performed using the CTL signal. In such a case, the tape speed for reproduction can be accurately controlled with respect to the recording operation. Specifically, in the case where the tape speed for reproduction is set to 1/12 of the tape speed for recording as in the first embodiment, the tape speed control is realized by setting the reproduction CTL signal frequency to 1/12 of the recording CTL signal frequency. According to the second embodiment under consideration, by contrast, the CTL signal is not used, but the tape drive is controlled in such a manner as to attain an equilibrium between the quantity of the digital signal reproduced and the quantity of the digital signal output. In FIG. 9, the recording operation, which is similar to that of the embodiment shown in FIG. 1 except that the CTL signal recording system is eliminated, will not be explained any more. Also, the reproduction operation is similar to that according to the embodiment shown in FIG. 1 except for the data quantity detection circuit 91 and the capstan servo circuit 22 provided anew and will not be explained any further. The operation of the data quantity detection circuit 91 and the capstan servo circuit 22 will be described in detail below.

Figure 10:
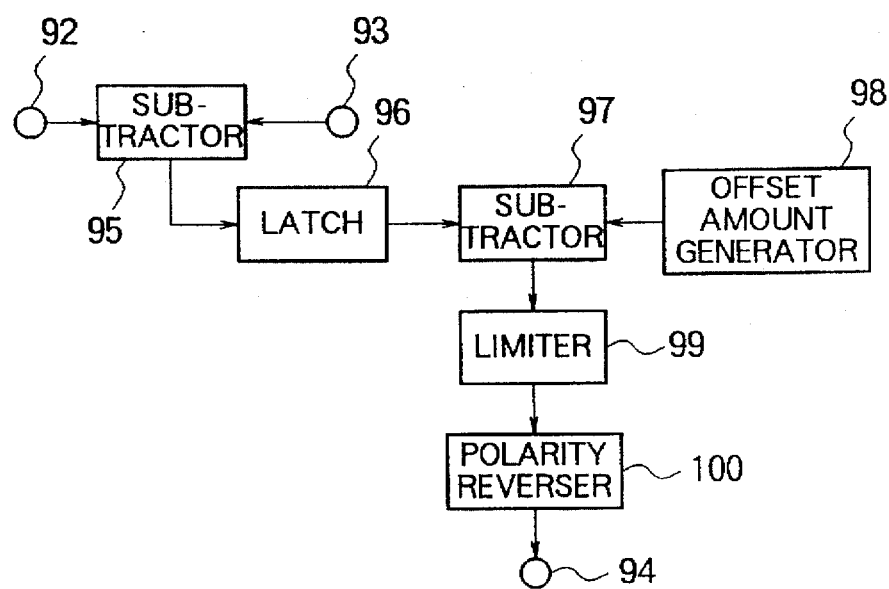
FIG. 10 is a block diagram showing the configuration of a data quantity detection circuit.
Figure 11:
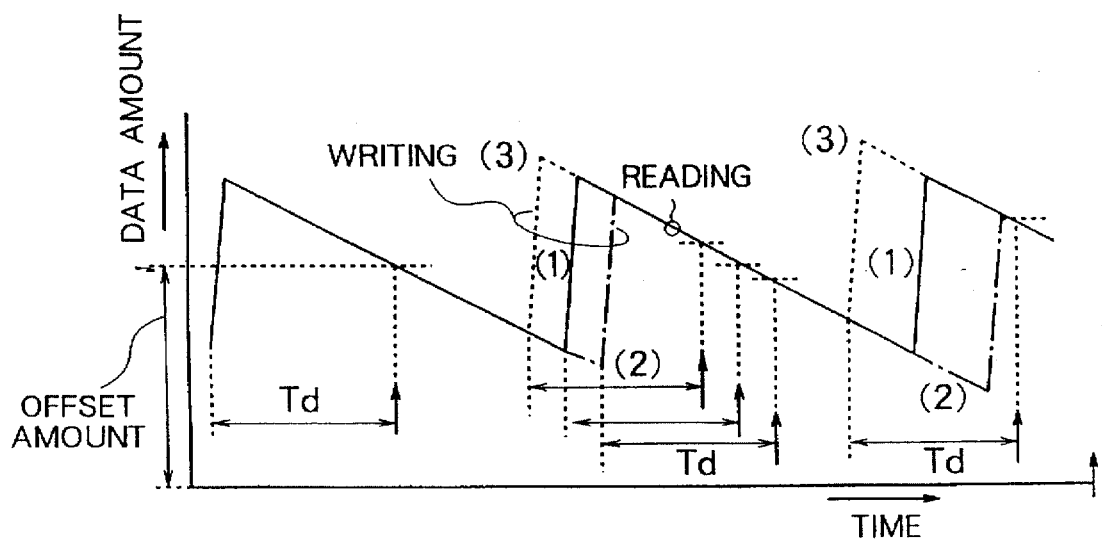
FIG. 11 is a diagram showing a data quantity difference signal waveform generated in the data quantity detection circuit.

In FIG. 9, the reproduction digital signal subjected to error correction at the DSP 25 at the time of reproduction is applied to the memory circuit 31 with the per track reproduction digital signal as a unit. In the process, the data quantity information of the digital signal applied to the memory circuit 31 is supplied to the data quantity detection circuit 91. The memory circuit 31 applies the reproduction digital signal supplied from the DSP 25 to the MPEG decoder 32 and the output terminal 9 as a reproduction digital signal of a predetermined transmission rate of, say, 1.5 Mbps in accordance with the output transmission rate designation signal supplied from the system controller 19. In the process, the data quantity information of the temporally-expanded digital signal output from the memory circuit 31 is supplied to the data quantity detection circuit 91. The data quantity detection circuit 91 supplied with the data quantity information written in the memory circuit 31 and the data quantity information read out from the memory circuit 31 generates a correction signal for tape speed control from the two data quantity information, and supplies the result to the capstan servo circuit 22. FIG. 10 shows a specific configuration of the data quantity detection circuit 91. In FIG. 10, numerals 92, 93 designate input terminals, numeral 94 an output terminal, numerals 95, 97 subtraction circuits, numeral 96 a latch circuit, numeral 98 an offset data quantity generating circuit, numeral 99 a limiter circuit, and numeral 100 a polarity reversing circuit. In FIG. 10, the write data quantity signal and the read data quantity signal for the memory circuit 31 supplied through the input terminals 92 and 93 are subtracted therebetween at the subtraction circuit 95. The data quantity difference signal generated by the subtraction processing at the subtraction circuit 95 is applied to the latch circuit 96. The latch circuit 96 latches the difference signal of the data quantity at a timing delayed by a predetermined time (Td) from the write timing into the memory circuit 31 of the digital signal supplied from, say, the DSP 25 The data quantity difference signal thus latched is subjected to the subtraction operation at the subtraction circuit 97 with the offset data quantity signal supplied from the offset data quantity generating circuit 98 and is supplied to the limiter circuit 99. The limiter circuit 99 limits the data quantity difference signal with the offset data quantity subtracted therefrom within a predetermined range, and applies it to the polarity reversing circuit 100. The polarity reversing circuit 100 reverses the polarity of the data quantity difference signal and applies the resultant signal to the capstan servo circuit 22 shown in FIG. 9 through the output terminal 94. FIG. 11 shows an example model waveform of the data quantity difference signal providing the output of the subtraction circuit 95 in FIG. 10. In FIG. 11, (1) designates the case in which the reproduction tape speed is controlled properly, (2) the case in which the tape speed is slow, and (3) the case in which the tape speed is high. The arrows in the drawing indicate the latch timings of the latch circuit 96. As understood from FIG. 11, the value of the data quantity difference signal varies with the tape speed, and therefore can be used as a correction signal for tape speed control. The latch circuit 96 is used as a smoothing means in view of the fact that the data quantity difference signal output from the subtraction circuit 95 is sawtooth shaped and the use of this signal as a correction signal for tape speed control disturbs the tape feed. Also, the polarity reversing circuit uses the data quantity difference signal (the correction signal for tape speed control) as a negatively-fedback signal. The polarity reversing circuit 100 may be eliminated by reversing the polarity of the subtraction circuit. Also, instead of smoothing the correction signal for tape speed control by the sample hold output using the latch circuit 96, the difference data quantity may be smoothed using an LPF (low-pass filter), for example. The capstan servo circuit 22 supplied with the correction signal for tape speed control has a configuration as shown in FIG. 5 as described before. In the capstan servo circuit 22, the speed error signal generated in the speed detection circuit 70, the speed target setting circuit 71 and the subtraction circuit 72 are similar to that in the first embodiment. This speed error signal and the correction signal for tape speed control supplied from the data quantity detection circuit 91 through the switch 74 closed to the B terminal side at the time of reproduction are applied to the add and characteristic compensation circuit 75. The capstan control signal generated by the add and characteristic compensation circuit 75, the D/A converter 76 and the MDA 77 is applied to the capstan motor 5 to rotate the capstan 4, so that the magnetic tape 1 is driven at the desired speed, i.e., at a tape speed at which the temporally-expanded reproduction digital signal can be output continuously without any overage or shortage.

The reproduction digital signal output from the memory circuit 31 at a predetermined transmission rate is supplied to the MPEG decoder 32 and the output terminal 9 and output by being processed in the same manner as in the first embodiment.

As described above, according to this embodiment, in the case where the temporally-compressed digital information signal supplied through the transmission line is recorded and reproduced at a tape speed corresponding to the temporal compression ratio of the recording information signal during reproduction, the data quantity of the digital signal reproduced from the magnetic tape is compared with the data quantity of the output digital signal at a predetermined transmission rate, and the tape speed for reproduction is controlled in such a manner as to set the difference between the two data quantities to a predetermined level. Since the reproduction digital signal can be continuously output without any overage or shortage with compression rational compression ratio (transmission rate), a large-scale buffer memory is not required for the reproduction which is possible with the time axis expanded to the original state.

Figure 12:
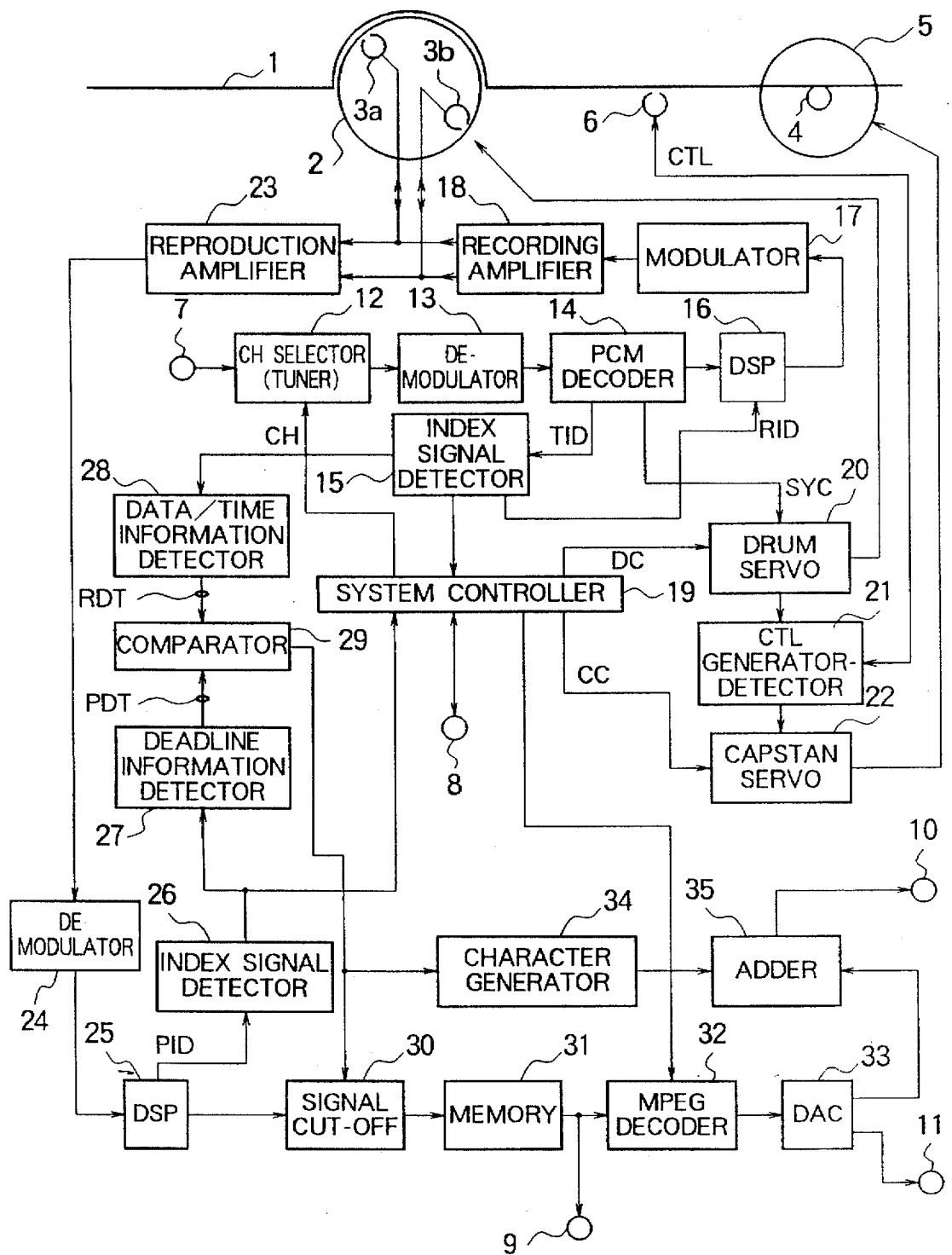
FIG. 12 is a block diagram showing the configuration of an information recording and reproduction apparatus according to the invention.

Now, an information recording and reproduction apparatus according to the present invention for achieving the second object of the invention will be explained with reference to FIG. 12. FIG. 12 is a block diagram showing the configuration of an information recording and reproduction apparatus to which the present invention is applied. In FIG. 12, the blocks designated by the same reference numerals as the blocks shown in FIG. 1 have the function identical or similar to those of the blocks described with reference to FIG. 1 respectively. The blocks newly added to the apparatus shown in FIG. 12 include a deadline information detection circuit 27, a date/time information detection circuit 28, a comparator circuit 29, a signal cut-off circuit 30, a character generator 34 and an added circuit 35. The differences with reference to the recording operation in FIG. 1 are explained hereinafter. An example data configuration for the recording index signal according to this embodiment is shown in FIG. 13. In FIG. 13, the index signal is configured in bytes, and ID0 determines the mode of the index signal. Numerals ID1 to ID7 designate the data/time information data for recording, ID8 data for determining the deadline mode, and ID9 to IDF deadline data. ID1 to IDF are used as user data or data such as the temporal compression ratio information, the type information for the recording information signal or the type information for the compression method of MPEG scheme based on ID0 data. This index signal is recorded in different index signal modes for each track, for example, thereby making possible the recording of various types of index information.

The recording digital signal with a redundant data such as the index signal added thereto is supplied to the modulation circuit 17 where it is modulated, and is then applied as a serial signal to the recording amplifier 18. The recording amplifier 18 amplifies the recording digital signal to a level suitable for magnetic recording and is recorded on the magnetic tape through the magnetic heads 3a and 3b with an optimum recording current.

During the reproduction operation, on the other hand, the reproduction signal reproduced from the magnetic tape 1 by the magnetic head 3a or 3b is sufficiently amplified at the reproduction amplifier 23 and is applied to the demodulation circuit 24. The demodulation circuit 24, after equalizing the waveform of the reproduction information signal supplied thereto, extracts the clock component, and using this clock, converts the reproduction data to a logic signal by strobing. An opposite demodulation operation to that for recording is performed to thereby supply a demodulated reproduction digital signal to the DSP 25. The DSP 25 detects and corrects an error of the reproduction digital signal and, at the same time, de-interleaves based on the address information to thereby restore the reproduction digital signal into the original data sequence. The index signal PID is applied to the index signal detection circuit 26 and the reproduction digital information to the signal cut-off circuit 30.

The above-mentioned index signal detection circuit 26, the deadline information detection circuit 27, the date/time information detection circuit 28, the comparator circuit 29 and the signal cut-off circuit 30 play an important role in protecting the copyright of the supplied information to attain the second object of the present invention. The index signal detection circuit 26 decodes the mode of ID0 shown in FIG. 13 and applies various index signals to the deadline information detection circuit 27 and the system controller 19. The deadline information detection circuit 27 extracts the index signals (ID9 to IDF in FIG. 4) relating to the reproduction deadline information of the digital information signal recorded from the reproduction index signal input, and applies the index signal PDT to the comparator circuit 29. Also, the system controller 19, with the index signal applied thereto, determines the reproduction mode by the reproduction index signal on the one hand while the information preferably to be supplied to the user such as the type of the recorded date/time and recording information is supplied to a display system (not shown) through the input/output terminal 8. The comparator circuit 29 supplied with the index signal relating to the reproduction deadline information is a circuit for deciding whether the date/time of the reproduction point has passed the deadline of the reproduction signal. For this reason, the comparator circuit 29 requires an absolute date/time information for the reproduction point. The absolute date/time information for the reproduction point is applied from the date/time information detection circuit 28. The date/time information detection circuit 28, as in the recording operation, applies the date/time information supplied from the transmission line 37 through the input terminal 7, the channel selector 12, the demodulation circuit 13, the PCM decoder 14 and the index signal detection circuit 15 to the comparator circuit 29. The comparator circuit 29 compares the reproduction deadline information with the absolute date/time information at the reproduction point, and applies a control signal to the signal cut-off circuit 30 and the character generator 34.

Although the foregoing description refers to the case in which the date/time information used for reproduction is transmitted as redundant data of the main digital information signal, the absolute date/time information may alternatively be transmitted, received and detected independently of the main digital information signal using a separate channel in the transmission line 37.

The signal cut-off circuit 30 supplied with the reproduction digital signal from the DSP 25 performs the switching operation for connecting and disconnecting the input reproduction digital signal to the memory circuit 39 in the next stage in accordance with the control signal supplied from the comparator circuit 29. This switching operation is accomplished in such a manner that as will be seen from the foregoing description, in the case where the date/time of the reproduction point has passed the reproduction deadline, the reproduction digital signal is cut off, while in the case where the date/time of the reproduction point is within the reproduction deadline, the reproduction digital signal is applied to the memory circuit 31. The memory circuit 31 converts the reproduction digital signal into a predetermined transmission rate and supplies it to the MPEG decoder 32 and the output terminal 9. The MPEG decoder 32 defreezes the compressed (expands) reproduction signal by decoding in accordance with the setting signal of the decoding scheme and the ID signal supplied from the system controller 19, and applies a digital video signal and a digital audio signal to the D/A converter 33. The D/A converter 33 converts the supplied digital video and audio signals into an analog signal, so that the video signal is applied to the adder circuit 35 and the audio signal to the output terminal 11. The adder circuit 35 composes and adds the reproduction video signal and the character signal supplied from the character generator 34 and outputs the sum through the output terminal 10. The character generator 34 generates a character signal for displaying an overdue indication on the monitor 48 (See FIG. 2) in order to inform the user that the deadline is passed in the case where the reproduction signal is cut off at the signal cut-off circuit 30 in accordance with the control signal supplied from the comparator circuit 29.

In the case where the reproduction digital signal is a data signal used for computer equipment or the like, the reproduction digital signal is converted into a predetermined transmission rate and output through the output terminal 9.

As explained above, according to the present embodiment, in recording and reproducing the information signal subject to a limited reproduction period supplied through the transmission line, the reproduction deadline for the supplied digital information is recorded together with the main information. This deadline information is detected at the time of reproduction, and in the case where the date and time of the reproduction point has passed the reproduction deadline, the output of the reproduction digital information can be cut off. As a consequence, the information supplied beyond a defined time range can be prevented from being reproduced and the copyright of the transmission information (recording and reproduction information) can be protected. Also, since the date and time information of the reproduction point providing a reference for determining the deadline is supplied from the transmission line, and the user cannot arbitrarily modify the data and time of the reproduction point, the deadline can be determined correctly.

Figure 14:
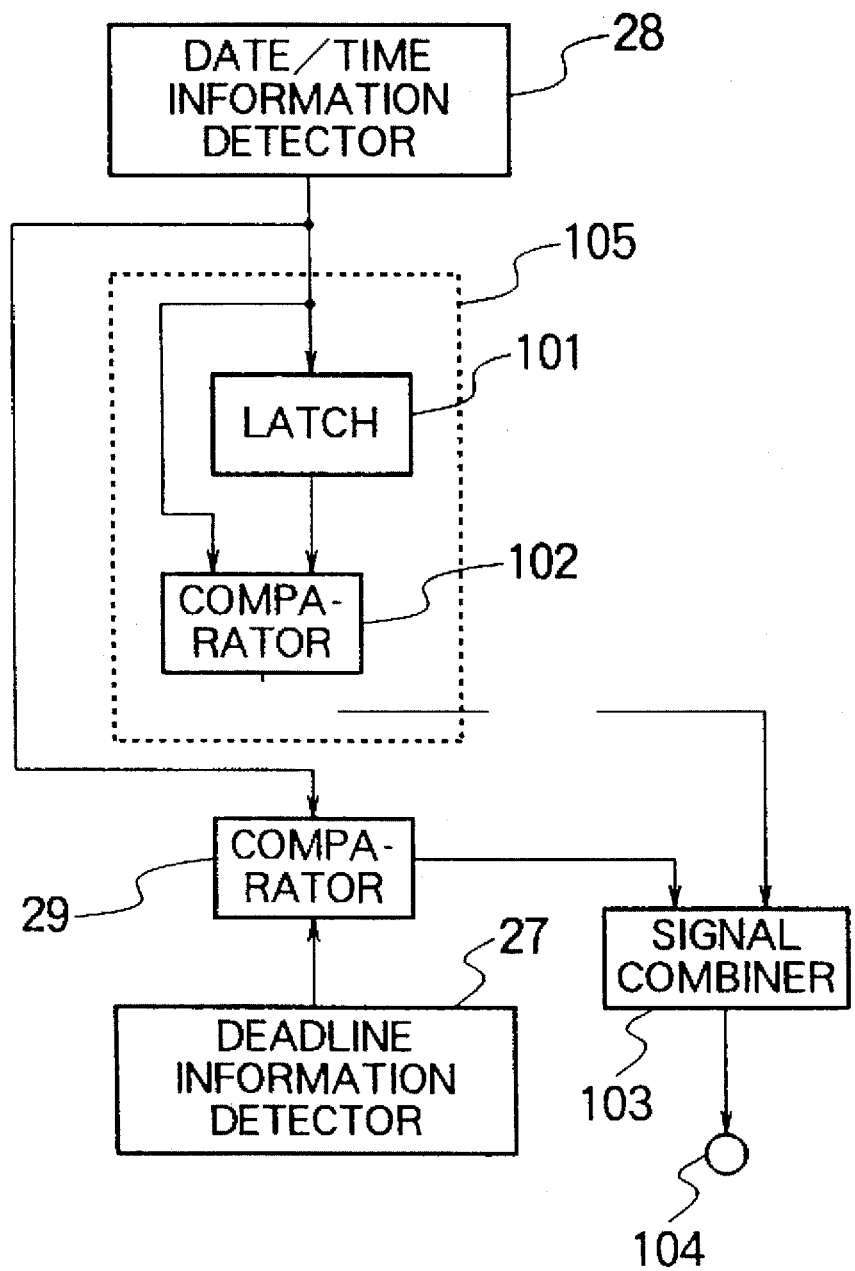
FIG. 14 is a block diagram showing the configuration of a cut-off detection circuit for the date/time information transmitted.

In the above-mentioned embodiment, the user may attempt to "pirate" (reproduce) the information after the deadline thereof by turning off the information recording and reproduction apparatus 47 and the transmission line 37 and thus blocking the updating of the absolute date and time of the reproduction point. In such a case, it is necessary to make some arrangement to positively cut off the reproduction signal providing the protection of the copyright. In order to prevent such piracy, as defined by the dashed line 105 in FIG. 14, for example, a circuit for detecting the blocking of the update of the absolute date/time information is inserted between the date/time information detection circuit 28 shown in FIG. 12 and the comparator circuit 29. In FIG. 14, the blocks labeled 27, 28, 29 are identical to those designated by the same numerals respectively in FIG. 12. Numeral 103 designates a signal combining circuit and numeral 104 a control signal output terminal. The date/time information update blocking detection circuit 105 includes a latch circuit 101 and a comparator circuit 102. In FIG. 14, the latch circuit 101 latches the date/time information supplied from the date/time information detection circuit 28 at predetermined time intervals, and applies the date/time information thus latched to the comparator circuit 102. The comparator circuit 102 compares the latched date/time information with the date/time information supplied directly from the date/time information detection circuit 28. In the case where S the date/time is not updated, the comparator 102 decides that the date/time information is not supplied and applies a control signal to the signal combining circuit 103. The signal combining circuit 103 generates a new control signal to be supplied to the signal cut-off circuit 30 and the character generator 34 from the control signal supplied from the comparator circuit 29 and the control signal supplied from the comparator circuit 102. The control signal supplied from the signal combining circuit 103 is controlled in such a manner that the signal cut-off circuit 30 cuts off the reproduction digital signal in the case where the date/time information is not supplied, and also in such a manner that the character generator 3a generates a character signal to promote confirmation of the connection with the transmission line 37 for lack of the date/time information supplied. In the case where the date/time information is supplied, by contrast, the output control signal of the comparator circuit 29 described above is directly applied to the signal cutoff circuit 30 and the character generator 34.

As described above, the provision of the date/time information blocking detection circuit to turn off the information recording and reproduction apparatus and the transmission line 37 during reproduction realizes the configuration in which the reproduction signal is positively cut off protecting the copyright against an act of piracy by the user attempting to reproduce the information that has passed the deadline by blocking the updating of the absolute date and time of the reproduction point.

Figure 15:
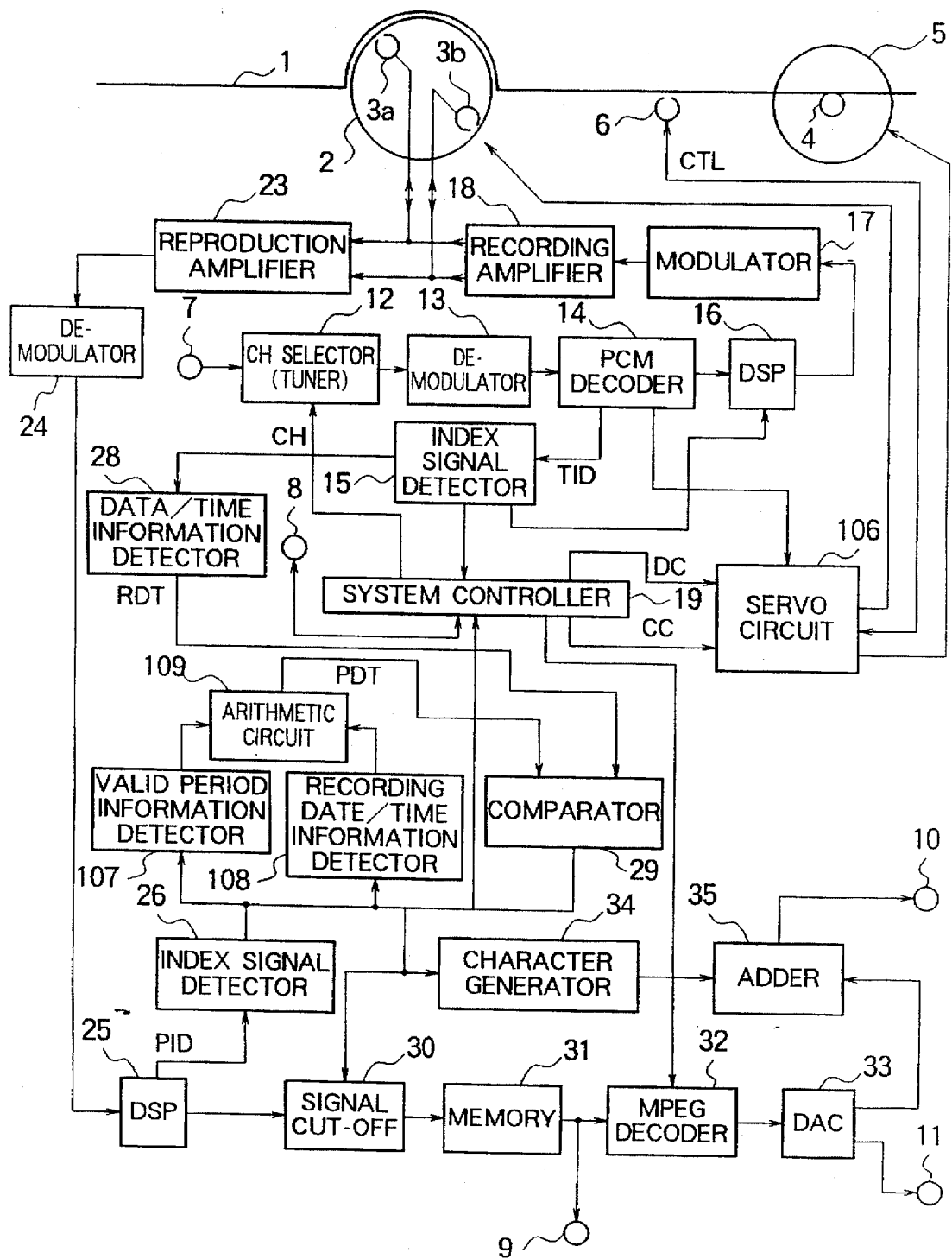
FIG. 15 is a block diagram showing the configuration of an information recording and reproduction apparatus according to the invention.

Now, explanation will be made about another embodiment for achieving the second object. The significant difference of the present embodiment from the embodiment shown in FIG. 12 lies in the way in which the deadline of the reproduction digital information is set. In the embodiment shown in FIG. 12, the reproduction deadline is set by an absolute date and time without regard to the date/time of information transmission and recording. According to the present embodiment, in contrast, the reproducible period is limited by a relative reproducible period which is set with respect to the date and time the information is transmitted and recorded. The embodiment will be explained in detail with reference to FIG. 15. FIG. 15 is a block diagram showing the configuration of an information recording and reproduction apparatus according to the present invention. In FIG. 15, the blocks designated by reference numerals identical to those in FIG. 12 have the same or similar functions as the corresponding component parts of the embodiment shown in FIG. 12 respectively. Numeral 106 in FIG. 15 designates a servo circuit which simply represents a combination of the drum servo circuit 20, the CTL generating and detection circuit 21 and the capstan servo circuit 22 in FIG. 12. The operation of the block 106 therefore is similar to that of the particular three blocks combined. The apparatus of FIG. 15 is different from that of FIG. 12 in the section thereof for determining the deadline of the reproduction information. In FIG. 15, the deadline information detection circuit 27 is eliminated, while a valid period information detection circuit 107, a recording date/time information detection circuit 108 and an arithmetic circuit 109 are newly added. The following explanation will be primarily centered on the operation of the section or determining the deadline of the reproduction information.

First, according to the embodiment under consideration, the reproduction deadline of information transmitted is set by setting the date/time information of the point when the transmission and recording are performed and a valid reproduction period relative to the date/time of the point when the transmission and recording are made. For this purpose, first, while the deadline information generating circuit 45 shown in FIG. 2 on the information supply side sets an absolute deadline, a relative valid period is generated by referencing the date/time information generated in the calendar timer circuit 43 and is supplied to the transmission line 37 together with the main digital information signal. Next, the recording system of the information recording and reproduction apparatus shown in FIG. 15 replaces information ID8 to IDF in the index signal shown in FIG. 13 with relative deadline information, i.e., the valid period information supplied from the transmission line. During the reproduction operation, the reproduction system detects the valid period information for the reproduction information at a valid period information detection circuit 107 from the reproduction index signal PID supplied from the index signal detection circuit 26 shown in FIG. 15, while the recording date/time information detection circuit 108 detects the recording date/time information. The valid period information and the recording date/time information are applied to an arithmetic circuit 109, where the valid reproducible period is added to the recording date/time as absolute deadline information PDT. This absolute deadline information PDT is applied to the comparator circuit 29. The comparator circuit 29, as in the embodiment shown in FIG. 12, compares the date/time information RDT for the reproduction detecting supplied from the date/time information detection circuit 28 with the absolute deadline information PDT supplied from the arithmetic circuit 109, and supplies a control signal to the signal cut-off circuit 30 and the character generator 34. The operation of the circuits including and subsequent to the signal cut-off circuit 30 and the character generator 34 are similar to the operation of the corresponding component parts of the embodiment shown in FIG. 12.

As described above, according to this embodiment, the information signal subject to a limited reproduction period supplied through the transmission line are recorded and reproduced in such a manner that the recording date/time information of the digital information supplied and the associated relative valid reproduction period information are recorded together with the main information during the recording operation. During the reproduction operation, the recording date/time information and the associated relative valid reproduction period information are reproduced. The absolute deadline is calculated from these two pieces of information. In the case where the reproduction date and time has passed the reproduction deadline, the output of the reproduction digital information is cut off. As a result, the information exceeding the limitation of the period is prevented from being reproduced, thereby protecting the copyright of the transmitted information (recording and reproduction information). Also, the date/time information of the reproduction point providing the basis for determining the deadline is supplied from the transmission line and therefore the user cannot change the reproduction date and time by himself. A valid deadline can thus be correctly determined.

According to the second embodiment described above, the valid reproduction period information with an 8-byte index signal ID8 to IDF assigned thereto as information on the year, month, day and time is used for recording and reproduction. In many cases, however, the valid period may alternatively be set in the number of hours or days with equal effect. In that case, the actual number of hours and/or days is not recorded in the index signal as information, but the one byte ID8 shown in FIG. 13 is assigned to the valid period information, for example. Thus, in the case where ID8 is "00", the subsequent ID9 to IDF are used to represent the valid period in terms of year, month, day, and time; in the case where ID8 is other than "00", "01" may represent one hour, "02" three hours, "03" six hours, "04" a half day, "05" one day, "06" two days, and so on. In this way, a specific valid period can be expressed by a one-byte index signal, in which case the index signal can be reduced or applied to other uses.

Further, for a system in which the valid period is fixed to, say, one day from the time point of information recording, the index signal shown in FIG. 13 may represent only the recording date and time information of ID0 to ID7. In this case, the valid period information detection circuit 107 shown in FIG. 15 is not necessary, and the fixed number of one day is added to the date/time information of the information recording point supplied from the recording date/time information detection circuit 108 to generate absolute deadline information PDT.

The foregoing embodiments require the absolute date/time information supplied through the transmission line during reproduction. This transmitted date/time information is preferably easily detected at any time. Consequently, even in the case where the main digital information signal is transmitted as private information as designated by the user, the absolute date/time information may be transmitted as non-private information or on another channel free of the user.

Figure 16:
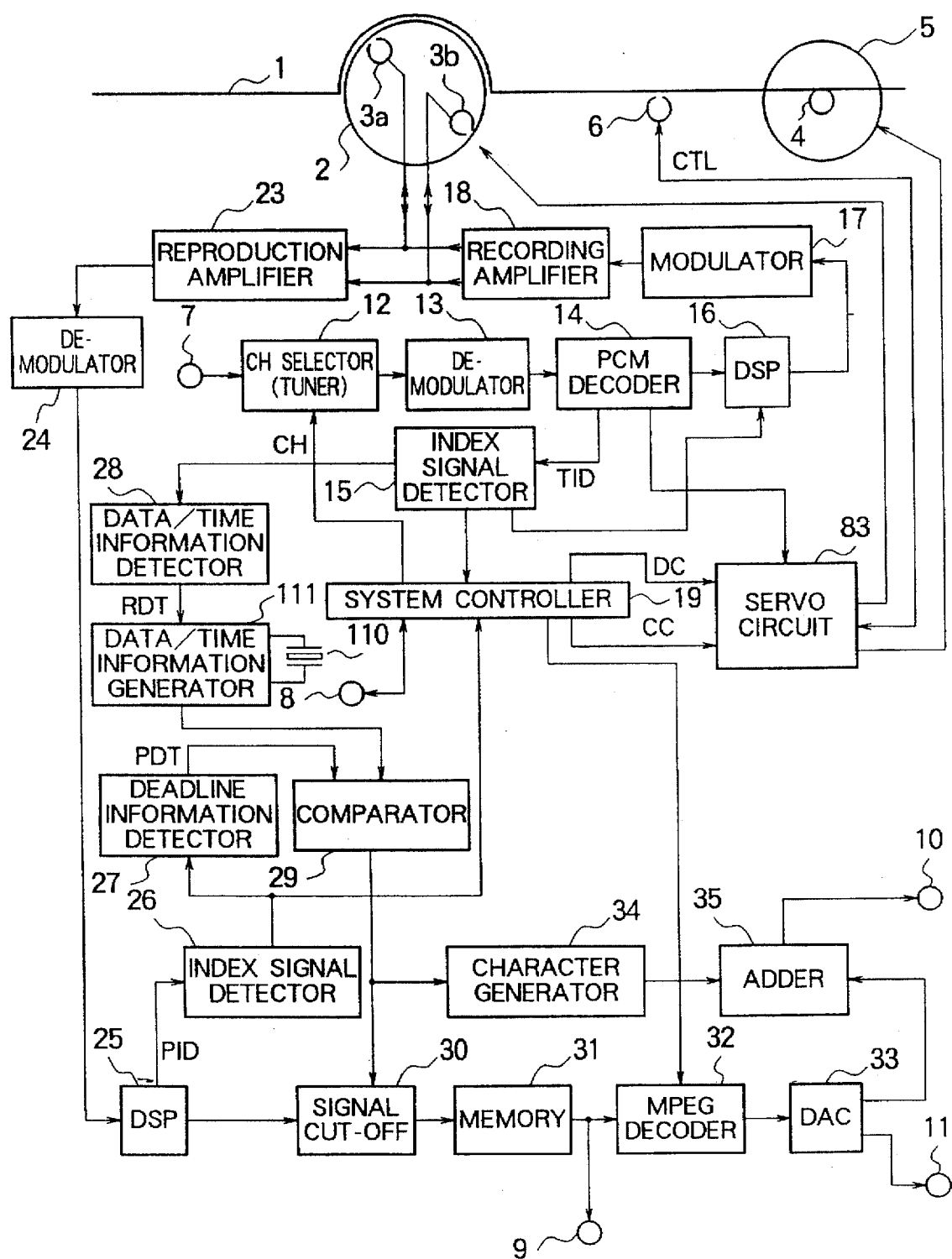
FIG. 16 is a block diagram showing the configuration of an information recording and reproduction apparatus according to the invention.

Now, still another embodiment will be explained. The significant difference of this embodiment from the foregoing embodiments lies in the means for generating the reproduction date/time information to be compared with the deadline information. According to the foregoing embodiments, the reproduction date/time information is supplied always from the information transmitting end 36 through the transmission line 37. In the present embodiment, by contrast, the means for generating the absolute date/time information is incorporated in the information recording and reproduction apparatus. This embodiment will be explained in detail with reference to FIG. 16. FIG. 16 is a block diagram showing the configuration of an information recording and reproduction apparatus to which the invention is applied. In FIG. 16, the blocks designated by the reference numerals identical to those of the blocks in FIGS. 12 or 15 have the same or similar functions as the corresponding component parts in FIG. 12 respectively. The apparatus shown in FIG. 16 is different from that of FIG. 12 in that the apparatus of FIG. 16 comprises means for generating the absolute reproduction date/time information supplied to the comparator circuit 29. Such means is included as a date/time information generating circuit 111 having a crystal oscillator 110 or the like. The following explanation will be primarily centered on the operation of the date/time information generating circuit 111.

First, according to this embodiment, the date/time information RDT is extracted at the date/time information detection circuit 28 from the transmitted index signal and supplied to the date/time information generating circuit 111. The date/time information generating circuit 111 generates a stable clock by means of the crystal oscillator 110 and generates date/time information by a timer using the crystal oscillator. The date/time information generating circuit 111 is reset by the date/time information RDT supplied from the date/time information detection circuit 28 to generate the absolute date/time information. This absolute date/time information is supplied to the compactor circuit 29 and is compared with the deadline contained in the reproduction signal during reproduction. The operation of the circuits including and subsequent to the comparator circuit 29 and the signal cut-off circuit 30 is similar to that of the corresponding parts of the embodiment shown in FIG. 12 described above.

The circuit for generating the date/time information is in many cases provided, for example, in the current VTR for realizing the timer-reserved,video recording. In the current VTR, however, the date/time can be set on the date/time information generating circuit freely by the user. Suppose the date and time on the date/time information generating circuit 111 according to the present embodiment can be freely set by the user as in the current commercially available VTR. In the case where the user wants to play back information after the deadline thereof has passed as an act of piracy, the date/time on the date/time information generating circuit 111 may be preset to a date/time before the deadline. Then the copyright of the recorded information cannot be protected. As a means for solving this problem, the date/time information generating circuit 111 is configured in such a manner as to be capable of being preset only by the absolute date/time information supplied through the transmission line. Suppose, on the other hand, that the date and time on the date/time information generating circuit 111 can be preset either by the user or by the date/time information supplied through the transmission line. When the information with a reproduction deadline setting is to be reproduced, the information is reproduced as it is in the case where the latest presetting of the date/time information generating circuit 111 is by the date/time information supplied through the transmission line, whereas the reproduction signal is blocked by the signal cut-off circuit 30 and information for prompting the presetting by the date/time information supplied through the transmission line is generated by the character generator 34 in the case where the date/time information generating circuit 111 is preset by the user. The former configuration car be implemented simply by the absence of a user preset mechanism, and the latter configuration can be realized by using the flip-flop function or the like for discriminatively detecting the presetting by the user and the presetting by the date/time information supplied from the transmission line.

As explained above, according to the present embodiment, in the case where the information with a limited reproducible period supplied through the transmission line is recorded and reproduced, the reproduction date and time information to be compared with the deadline information at the time of reproduction can be generated within the apparatus during the reproduction operation. Therefore, it is not necessary to keep the date/time information supplied from the transmission line during the reproduction operation, thereby broadening the application fields of the apparatus, including its portability. In the case where the information with a set deadline is reproduced, the reproduction date/time information can always be set as absolutely legitimate date/time information to prevent the piracy action, thereby protecting the copyright of the transmitted (recording and reproduction) information.

It will thus be understood from the foregoing description that according to this invention the temporally-compressed digital information signal supplied through the transmission line can be recorded and reproduced at the desired temporal compression ratio, i.e., at the desired transmission rate without any large-capacity buffer memory for reproduction.

Also, there is provided an information recording and reproduction apparatus for recording and reproducing the information supplied through the transmission line, wherein the reproduction deadline is determined for the information transmitted and recorded, and in the case where the deadline is passed, the reproduction signal of the transmitted information is cut off, thereby making it possible to protect the copyright of the supplied information. As a result, many video software and other information can be distributed at low cost through a digital information network. Thus, the effect of the present invention is very extensive in meeting the needs of users desiring to acquire a great amount of information at lower cost through the development of digital information networks.

What is claimed is:

1. An information recording and reproduction apparatus comprising:

means for recording a first information signal providing a main information signal supplied through a transmission line and a first temporal information signal attached to the first information signal and providing temporal information including the date and time;

means for reproducing the first information signal and the first temporal information signal;

means for detecting a second temporal information signal supplied through the transmission line at the time of reproduction and providing temporal information including the date and time;

means for comparing the first temporal information signal reproduced by said reproducing means with the second temporal information signal detected by said detecting means; and means for cutting off a reproduction output signal of said first information signal in accordance with a comparison signal produced from the comparing means;

wherein in the case where the second temporal information signal has passed a predetermined deadline based on the first temporal information signal, said signal cutting-off means cuts off the reproduction output signal of said first information signal.

2. An information recording and reproduction apparatus according to claim 1, further comprising means for generating display information indicating that the reproduction deadline of said first information signal has passed, when said cutting-off means cuts off said first information signal.

3. An information recording and reproduction apparatus according to claim 1, wherein in the case where said second temporal information signal fails to be supplied to said comparing means supplies a control signal to said cutting-off means in such a manner as to always cut off the reproduced first information signal.

4. An information recording and reproduction apparatus comprising:

means for recording a first information signal providing a main information signal supplied through a transmission line, and a second information signal attached to the first information signal and representing a reproduction deadline of the first information signal;

means for reproducing the first information signal and the second information signal;

means for detecting a third information signal supplied through said transmission line at the time of reproduction providing temporal information including date and time;

means for comparing the second information signal reproduced by said reproducing means with the third information signal detected by said detecting means; and means for cutting off the output of the reproduced first information signal in accordance with a comparison result produced from said comparing means;

wherein in the case where the temporal information providing the third information signal has passed the reproduction deadline provided by the second information signal, said signal cutting-off means cuts off the reproduced output of said first information signal.

5. An information recording and reproduction apparatus according to claim 4, further comprising means or generating display information indicating that the reproduction deadline of said first information signal has passed, when said cutting-off means cuts off said first information signal.

6. An information recording and reproduction apparatus comprising:

means for recording a first information signal providing a main information signal supplied through a transmission line, a second information signal attached to a first information signal and representing a valid reproducible period of the first information signal and a third information signal providing temporal information including date and time;

means for reproducing the first information signal, the second information signal and the third information signal;

means for detecting a fourth information signal supplied through the transmission line at the time of reproduction providing temporal information including the date and time;

arithmetic means for calculating a reproduction deadline from the second information signal and the third information signal reproduced by said reproducing means;

means for comparing the reproduction deadline information calculated by said arithmetic means and the fourth information signal detected by said detecting means; and means for cutting off the output of the reproduced first information signal in accordance with a comparison result produced from said comparing means;

wherein in the case where the temporal information provided by the fourth information signal has passed the reproduction deadline calculated by said arithmetic means, said signal cutting-off means cuts off the output of said reproduced first information signal.

7. An information recording and reproduction apparatus according to claim 6, further comprising means for generating display information indicating that the reproduction deadline of said first information signal has passed, when said cutting-off means cuts off said first information signal.

8. An information recording and reproduction apparatus comprising:

means for recording a first information signal providing a main information signal supplied through a transmission line and a second information signal attached to said first information and representing a reproduction deadline of the first information signal;

means for reproducing the first information signal and the second information signal;

means for generating a third information signal providing temporal information including date and time;

means for comparing the reproduced second information signal with the third information signal generated by said temporal information generating means; and means for cutting off the output of said reproduced first information signal in accordance with a comparison result produced from said comparing means;

wherein in the case where the temporal information provided by said third information signal has passed the reproduction deadline, said signal cutting-off means cuts off the output of said reproduced first information signal.

9. An information recording and reproduction apparatus according to claim 8, wherein said temporal information including the date and time generated by said temporal information generating means is preset by temporal information supplied through the transmission line including the date and time.

10. An information recording and reproduction apparatus according to claim 8, further comprising means for generating display information indicating that the reproduction deadline of said first information signal has passed, when said cutting-off means cuts off said first information signal.

11. An information recording and reproduction apparatus for recording a temporally-compressed digital information signal supplied through a transmission line and reproducing said digital information signal at a tape speed different from that for recording so that a transmission rate of the digital information signal for reproduction is different from that for recording;

wherein a recording system of said apparatus includes means for adding a first error detection-correction code to each predetermined unit of an input digital signal supplied through the transmission line, means for dividing the digital signal with said error detection-correction code added thereto into predetermined blocks and adding an address signal to said digital signal, means for adding a second error detection-correction code to the digital signal with the address signal added thereto, modulation means for converting said digital signal into a predetermined signal form, means for recording said predetermined signal form on a magnetic tape, and means for driving the magnetic tape at a first speed;

wherein a reproduction system of said apparatus includes means for driving the magnetic tape at a second speed corresponding to a temporal compression ratio of the input digital signal, means for detecting a modulated reproduction signal from said magnetic tape, demodulation means for restoring the modulated reproduction signal into an original digital signal form, error detection means for extracting a correct reproduction digital signal by the second error detection-correction code, means for detecting an address signal, memory means for writing the correct reproduction digital signal into a predetermined area in the memory means in accordance with the address signal, means for detecting another reproduction digital signal from the second following track counted from the track with the reproduction digital signal recorded therein, means for correcting an error of each predetermined unit of said reproduction digital signal written in said memory means using the first error detection-correction code, and temporal expansion means for reading out an error-corrected reproduction digital signal at a predetermined transmission rate;

wherein the updating of the digital signal in said memory means is stopped and the error correction of each predetermined unit of said reproduction digital signal is started by said error correcting means in accordance with the detection signal produced from said signal detecting means.

12. An information recording and reproduction apparatus according to claim 11, wherein said predetermined unit to which said first error detection-correction code is added is the amount of the digital signal corresponding to said one-track of information.

13. An information recording and reproduction apparatus according to claim 11, wherein when the temporal compression ratio of said input digital signal is assumed to be 1/N, the second tape speed of said tape drive means is set to a speed 1/N of the first tape speed.

14. An information recording and reproduction apparatus for recording a temporally-compressed digital information signal supplied through a transmission line and reproducing the digital information signal at a tape speed different from that for recording so that a transmission rate of the digital information for reproduction is different from that for recording;

wherein a recording system of said apparatus includes means for adding a first error detection-correction code to each predetermined unit of the input digital signal supplied through the transmission line, means for dividing the digital signal with the first error detection-correction code added thereto into predetermined blocks and adding an address signal to said digital signal, means for adding a second error detection-correction code to said digital signal with an address signal added thereto, modulation means for converting the recording digital signal into a predetermined signal form, means for recording the predetermined signal form on a magnetic tape, and means for driving the magnetic tape at a first speed;

wherein a reproduction system of said apparatus includes means for driving the magnetic tape at a second speed corresponding to the temporal compression ratio of the input digital signal, means for detecting the modulated reproduction signal from the magnetic tape, demodulation means for restoring the modulated reproduction signal to an original digital signal form, error detection means for extracting a correct reproduction digital signal by using the second error detection-correction code, means for detecting an address signal, memory means for writing the correct reproduction digital signal in a predetermined area in the memory means in accordance with an address signal, means for detecting the data amount of the reproduction digital signal stored in the memory means, means for correcting an error of each predetermined unit of the reproduction digital signal stored in the memory means using the first error detection-correction code, and temporal expansion means for reading out the error-corrected reproduction digital signal at a predetermined transmission rate;

wherein the second magnetic tape speed for the tape drive means of the reproduction system is controlled in accordance with the data amount detected by said data amount detecting means.

15. An information recording and reproduction apparatus for recording a temporally-compressed digital information signal supplied through a transmission line and reproducing the digital information signal at a tape speed; different from that for recording so that a transmission rate of the digital information signal for reproduction is different from that for recording;

said apparatus comprising means for recording the input digital signal supplied through the transmission line, means for driving the magnetic tape at a first speed at the time of recording, means for driving the magnetic tape at a second speed corresponding to a temporal compression ratio of the input digital signal at the time of reproduction, means for detecting the reproduction signal from the magnetic tape, memory means for writing the detected reproduction digital signal in a predetermined area in the memory means, and means for detecting the data amount of the reproduction digital signal stored in said memory means;

wherein the second magnetic tape speed for the tape drive means of the reproduction system is controlled in accordance with the data amount detected by said data amount detecting means.

* * * * *